US011966954B2

United States Patent
Patel et al.

(10) Patent No.: US 11,966,954 B2
(45) Date of Patent: Apr. 23, 2024

(54) PLATFORM INDEPENDENT POSITIVE RECOMMENDATION SYSTEM

(71) Applicants: Upendra Patel, Wesley Chapel, FL (US); Himani Shukla, Canton, MI (US)

(72) Inventors: Upendra Patel, Wesley Chapel, FL (US); Himani Shukla, Canton, MI (US)

( * ) Notice: Subject to any disclaimer, the term of this patent is extended or adjusted under 35 U.S.C. 154(b) by 128 days.

(21) Appl. No.: 17/706,219

(22) Filed: Mar. 28, 2022

(65) Prior Publication Data
US 2023/0079369 A1      Mar. 16, 2023

Related U.S. Application Data

(60) Provisional application No. 63/244,290, filed on Sep. 15, 2021.

(51) Int. Cl.
*G06Q 30/00* (2023.01)
*G06Q 30/0282* (2023.01)

(52) U.S. Cl.
CPC .............................. *G06Q 30/0282* (2013.01)

(58) Field of Classification Search
None
See application file for complete search history.

(56) References Cited

U.S. PATENT DOCUMENTS

| | | | |
|---|---|---|---|
| 2003/0093326 A1* | 5/2003 | Poon | G06Q 30/08 705/26.62 |
| 2009/0271368 A1* | 10/2009 | Channell | G06F 16/951 |
| 2011/0191406 A1* | 8/2011 | Plunkett | G06Q 50/01 709/203 |
| 2013/0191180 A1 | 7/2013 | Teo et al. | |
| 2014/0040161 A1 | 2/2014 | Berlin | |
| 2016/0314476 A1* | 10/2016 | Clurman | G06Q 30/0282 |
| 2016/0350831 A1* | 12/2016 | Tolia | H04L 67/52 |
| 2017/0068974 A1 | 3/2017 | Firestone | |
| 2019/0050868 A1 | 2/2019 | Shukla et al. | |
| 2019/0156378 A1 | 5/2019 | Montano | |
| 2020/0219151 A1* | 7/2020 | Beltrani | G06Q 30/0282 |
| 2022/0027976 A1* | 1/2022 | Sherp | G06Q 30/0282 |

* cited by examiner

*Primary Examiner* — Matthew T Sittner
(74) *Attorney, Agent, or Firm* — Christopher P. Maiorana, PC

(57) ABSTRACT

A system comprising a database and a computing device. The database may be configured to store, sort and retrieve for each of a plurality of users a unique account and comments associated with the unique account. The computing device may be configured to display comments retrieved from the database associated with the unique account, generate an identification code to enable a commenter to add the comments to the unique account and communicate the comments to the database. The comments may comprise positive feedback about the users. The identification code may enable the commenter to add the comments without being one of the users. The comments may be displayed in response to an approval by the user of the unique account. The positive feedback may comprise a personalized message by the commenter about a performance of one of the users.

18 Claims, 12 Drawing Sheets

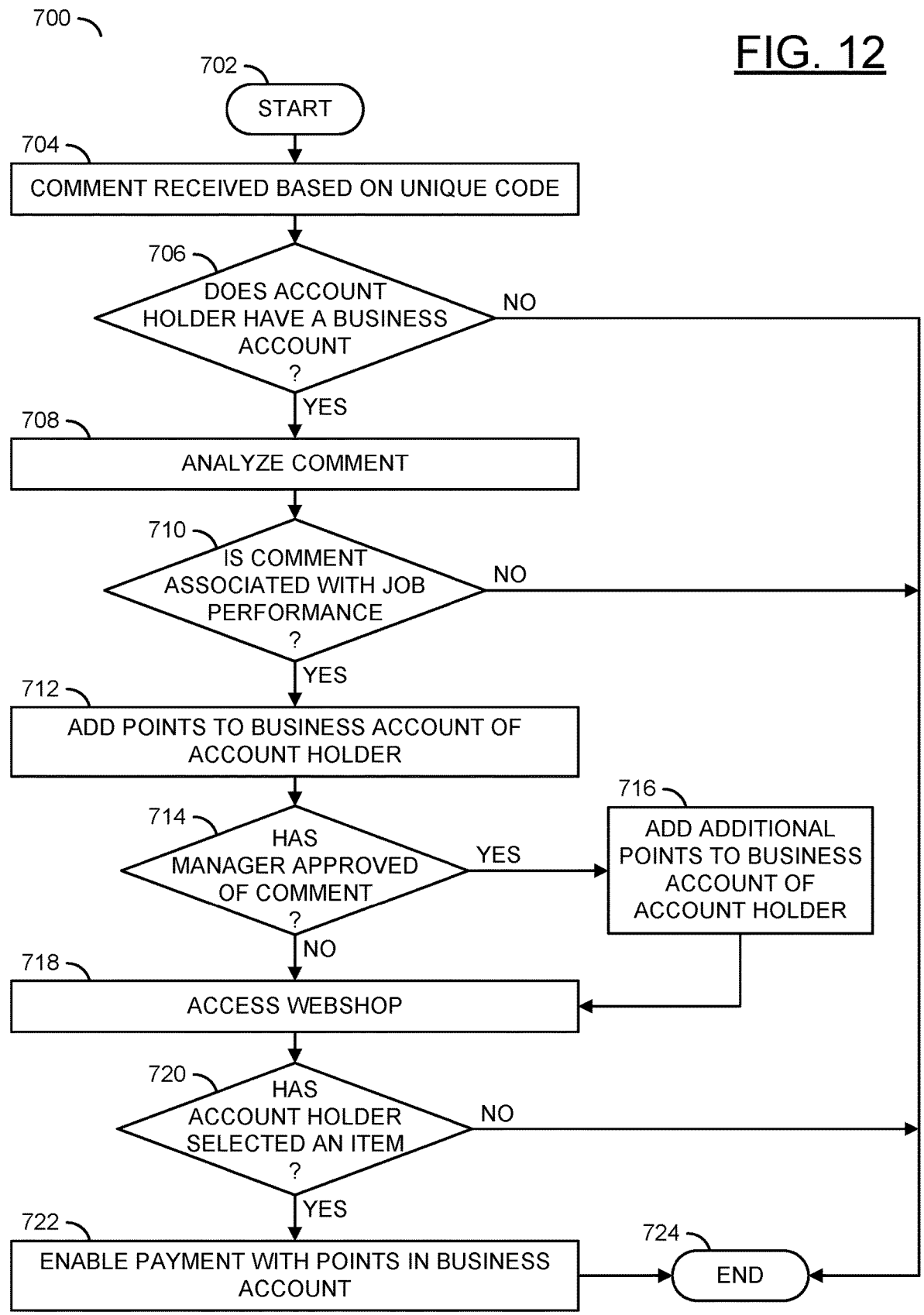

PLATFORM INDEPENDENT POSITIVE RECOMMENDATION SYSTEM

This application relates to U.S. Provisional Application No. 63/244,290, filed on Sep. 15, 2021, which is hereby incorporated by reference in its entirety.

FIELD OF THE INVENTION

The invention relates to a mobile app generally and, more particularly, to a method and/or apparatus for implementing a platform independent positive recommendation system.

BACKGROUND

User reviews are becoming an increasingly important aspect of consumer activities. Many people shop for goods and services by looking up a business online, and checking reviews made by other users. Some businesses thrive or die because of reviews.

User reviews can be problematic. Some businesses can buy positive reviews from review farms. Some businesses can suffer from negative reviews from a review bombing campaign resulting from non-business activities (i.e., political statements). Even with legitimate reviews, consumers are more likely to share a negative review than a positive review (i.e., good customer service is expected and considered routine, but negative experiences stand out and drive people to take the time to engage).

Conventional consumer reviews are provided for a business as a whole. An experience with a business can change as the employees at a business change over time. Conventional reviews do not provide a way for individuals to bring their reputation and goodwill to potential employers. Negative reviews can have an effect on the mental well-being of a person.

Online content is ephemeral. Content changes over time. Some content is deleted. Often, a webpage or social media account changes quickly in either design or content. Printing a website usually provides results that do not look the same as the webpage did. Web content can appear different when viewed on different devices. Saving a record of online content to be viewed offline is unreliable. Some people prefer holding a physical object (i.e., paper), instead of solely having access to online content.

It would be desirable to implement a platform independent positive recommendation system.

SUMMARY

The invention concerns a system comprising a database and a computing device. The database may be configured to store, sort and retrieve for each of a plurality of users a unique account and comments associated with the unique account. The computing device may be configured to display comments retrieved from the database associated with the unique account, generate an identification code to enable a commenter to add the comments to the unique account and communicate the comments to the database. The comments may comprise positive feedback about the users. The identification code may enable the commenter to add the comments without being one of the users. The comments may be displayed in response to an approval by the user of the unique account. The positive feedback may comprise a personalized message by the commenter about a performance of one of the users.

BRIEF DESCRIPTION OF THE FIGURES

Embodiments of the invention will be apparent from the following detailed description and the appended claims and drawings.

FIG. 12 is a flow diagram illustrating a method for accumulating points based on comments.

DETAILED DESCRIPTION OF THE EMBODIMENTS

Figure 1:
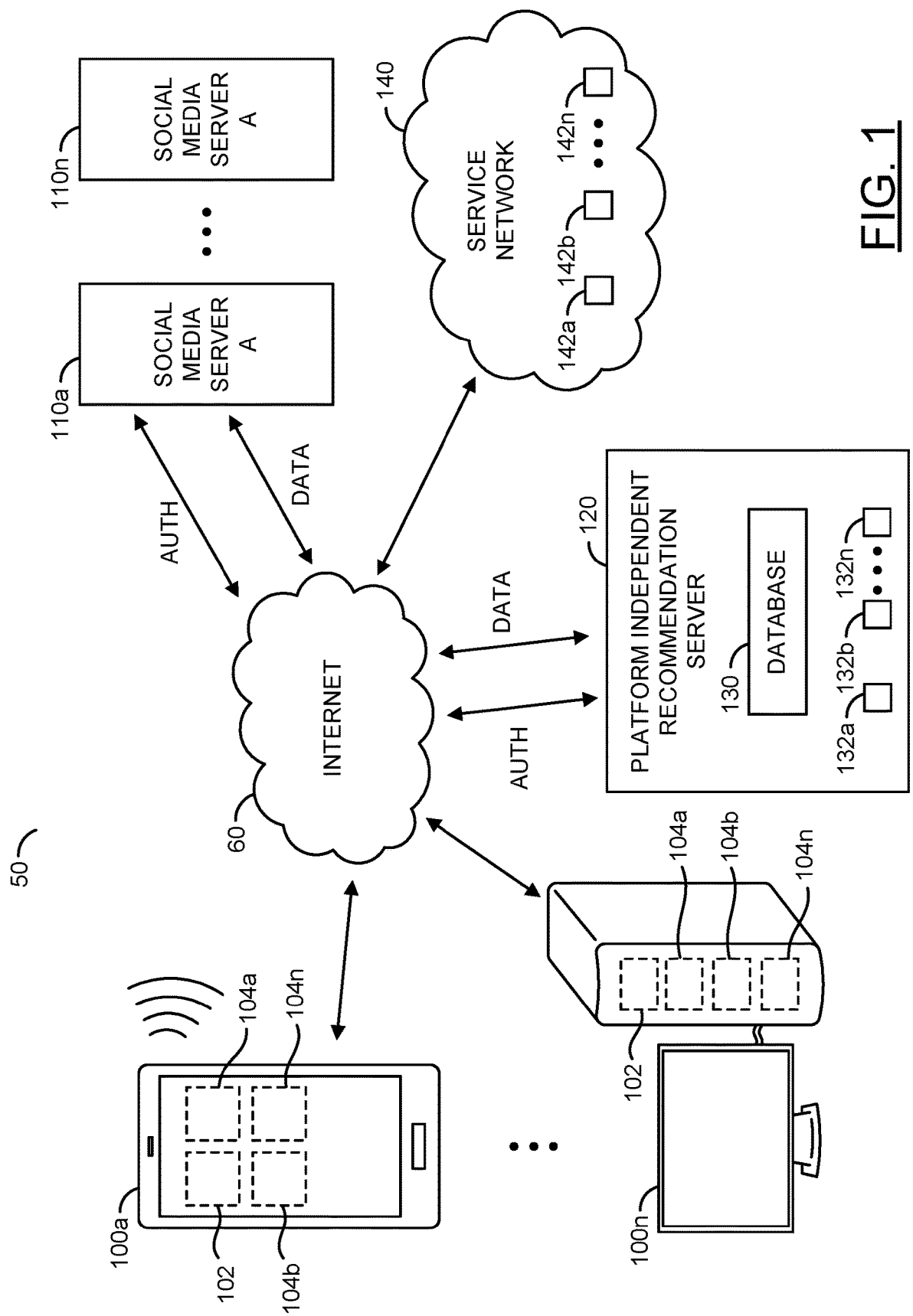
FIG. 1 is a block diagram of an example embodiment of the present invention.

Embodiments of the present invention include providing a platform independent positive recommendation system that may (i) provide personalized messages, (ii) provide recommendations that follow a person from job-to-job, (iii) facilitate collecting comments from customers, (iv) connect to various social media platforms, (v) enable users to approve and delete comments, (vi) authenticate comments, (vii) provide a private comment list, (viii) output comments to a job application, (ix) be implemented on multiple operating system platforms and/or (x) be easy to implement.

Embodiments of the present invention may be configured to implement a platform independent positive recommendation system. The recommendation system may be configured to enable users to provide positive comments to each other. Generally, the comments may not comprise a rating or a comparison to other users. The comments may provide authenticated recommendations that may be used privately by the recipient of the comments. For example, the comments may be used as a form of self-promotion (e.g., to attract customers for a business, to help a person find employment, to build self-esteem, to receive a retirement gift, to print all the reviews/comments as a book, etc.).

In some embodiments, the platform independent positive recommendation system may enable a service provider to receive a positive recommendation and/or comment from a customer. For example, a physiotherapist practice may have multiple employees. The customer may be served by only one physiotherapist in the practice. Instead of providing a review to the business as a whole, the customer may leave personalized feedback for the particular physiotherapist that provided services to the customer. If the physiotherapist leaves the practice for another job opportunity, the comments provided by the customer(s) may follow the physiotherapist. For example, the physiotherapist may use the positive comments when applying for a new job (e.g., as a reference, as proof of competency, etc.).

Generally, the platform independent positive recommendation system may enable anyone to open an account. Basic details may be provided in order to open an account (e.g., name, address, level of education, an email address, photo (s), a phone number, an occupation, a resume, years of experience, etc.). When an account is opened, the account holder may receive a unique code (e.g., a QR code, a link, a barcode, etc.). The unique code may provide access for other people to leave comments in a comment list of the account holder. For example, anyone that scans the unique code may provide a comment to the comment list of an account holder. The comment may be provided by another account holder, or a person that does not also have an account (e.g., a guest comment).

When a comment is received, the comment may appear in the comment list of the account holder. The account holder may have an option to keep the comment or delete the comment. In some embodiments, a filter may be implemented to automatically screen inappropriate comments. Generally, the comments may be positive comments. The account holder may further share accepted comments to various social media or communication platforms (e.g., Facebook, Twitter, WhatsApp, Instagram, text messages, etc.).

When an account holder is ready to close the account, or at any time while the account is open, the account holder may have an option to order a book or journal. The platform independent positive recommendation system may enable ordering a physical book or journal comprising all of the comments received (e.g., the approved comments). For example, the platform independent positive recommendation system may be configured to export all of the comments to a physical book that may be purchased (e.g., bought personally by the account holder, or by another person as a gift for the account holder). The physical print of the comments may be kept as a memory/memento.

Generally, anyone may submit comments by providing a name and an email address. Photos (or a profile picture) may be attached along with a comment. Comments submitted and approved may be provided in the comment list in chronological order. The account holder may select particular comments to promote. The promoted comments may appear first (e.g., before the chronologically ordered comment list). In some embodiments, the account holder may have an option to contact the commenter (e.g., to fix typos, or remove inappropriate language). If the comment is provided by a guest, then the account holder may not have the option for contact (e.g., only the name will appear, along with the comment).

The account holder may set the comment list to a public mode or a private mode. If the account is private, then the comment list of the account holder may not appear on the website of the platform independent positive recommendation system when people perform a search. If the account is public, then the name, the comment list and/or other information may be provided as results in response to a search of the webpage of the platform independent positive recommendation system.

The platform independent positive recommendation system may be configured to provide an option for a job search. When viewing their account profile, the account holder may select an option for a job search. The job search option may ask the account holder for job search information (e.g., occupation type, years of experience, area of expertise, a desired employment location/region, salary expectations, etc.). The platform independent positive recommendation system may submit the job search information received along with the comment list of the account holder to recruiters that may be using the platform independent positive recommendation system. Job recruiters may be able to contact account holders if a position is available.

Some of the comments received may be improvement suggestions from the commenter. Improvement suggestions may be received by the account holder, but may not be published even if the account is set to public. For example, improvement suggestions may be stored separately from comments for the account holder (e.g., the improvement suggestions may not be displayed publicly). For account holders that work at a particular business (e.g., multiple employees may have an account that work at a single business), comments received may be used as a reward system. In some embodiments, the comments received may be used as a performance review by a manager of employees that are account holders. In some embodiments, employees may receive points on the basis of each comment. For example, an account holder may receive 10 points per comments and an additional 10 points if the comment is approved by a manager. The points accumulated by the account holder may be used to purchase items in a webstore provided by the platform independent positive recommendation system. For example, every 10 points may be equivalent to one dollar that may be applied to purchasing items on the webstore.

Referring to FIG. 1, a block diagram of a system 50 showing an example network 60 is shown in accordance with an embodiment of the present invention. The system 50 shows the network 60, computing devices 100a-100n, a number of social media servers 110a-110n, a server 120 and a service network 140. The computing devices 100a-100n may connect to the servers 110a-110n and the server 120 through the network 60. The computing devices 100a-100n may each implement an application 102 and/or hardware components 104a-104n. The server 120 may include a database 130 and/or hardware components 132a-132n. The service network 140 may comprise one or more web pages (or web-based databases) 142a-142n.

The computing device 100a may be a handheld device. The computing device 100n may be a desktop computer. Other types of computing devices 100a-100n may be implemented (e.g., a smartphone, a tablet computing device, a smart watch, a virtual reality headset, a laptop computer, a netbook computer, a notebook computer, etc.). The computing devices 100a-100n may each implement the application 102. In an example, the application 102 may be a mobile application (e.g., an app), a computer executable program and/or a web-based application.

The computing devices 100a-100n may each comprise various hardware and/or software 104a-104n. The hardware and/or software 104a-104n may comprise a memory, a processor, a communications device, and/or any other hardware components. The memory may store an operating system and programs/applications (e.g., apps). The apps may operate on various operating system platforms (e.g., Windows, iOS, Linux, Android, Windows Phone, macOS, Chromium OS/Chrome OS, Blackberry, Fuchsia, OS, etc.). The apps may allow the user to connect to and/or interact with the servers 110a-110n and/or the server 120. The processor may be configured to perform computer executable instructions to run the OS and/or the apps. The communications device may allow the computing devices 100a-100n to connect to the network 60. For example, the communications device may be a Wi-Fi interface, a hardwired interface (e.g., Ethernet), and/or a cellular communications interface.

The servers 110a-110n may be servers (or content delivery networks) implementing social networks (e.g., Facebook, Twitter, Instagram, TikTok, etc.). The servers 110a-110n may authenticate users and/or send/receive data. The servers 110a-110n may provide wide-spread communication options for the users.

The server 120 may be a platform independent positive recommendation server. The server 120 may securely store information for various users. The server 120 may be used to authenticate the user (e.g., verify an identity and/or contact information of a particular user) and/or verify credentials of the user. The authentication may allow the app 102 stored on and/or accessed by the computing devices 100a-100n to ensure a user making a request is a valid user and/or ensure that one user is actually interacting with the other user as expected.

The platform independent positive recommendation server 120 may comprise the database 130 and/or the hardware components 132a-132n. The hardware components 132a-132n may comprise a memory, a processor, a communications device, and/or any other hardware components. In some embodiments, the database 130 may be implemented by a combination of the hardware components 132a-132n. In an example, the hardware component 132a may comprise a processor (or processors) and the hardware component 132b may comprise a memory implemented by the platform independent positive recommendation server 120. The combination of the processor 132a and the memory 132b may store and execute computer readable instructions in order to perform operations for the database 130. The database 130 may operate on various operating system platforms (e.g., Windows, iOS, Linux, Android, Windows Phone, macOS, Chromium OS/Chrome OS, Blackberry, Fuchsia, OS, etc.). In one example, the hardware component 132c may comprise a communication device (e.g., configured to implement a wired or wireless protocol). The communication device 132c may allow the platform independent positive recommendation server 120 to connect to and/or interact with the computing device 100a-100n, the servers 110a-110n and/or the service network 140.

The processor 132a may be configured to perform computer executable instructions to run the OS and/or the database 130. The communications device 132c may allow the platform independent positive recommendation server 120 to connect to the network 60. For example, the communications device 132c may be a Wi-Fi interface, a hardwired interface (e.g., Ethernet), and/or a cellular communications interface. While the hardware components 132a-132n are each shown as single devices, the platform independent positive recommendation server 120 may be configured to operate using multiple devices configured to scale resources on demand (e.g., cloud processing and/or cloud storage comprising accessing processing capabilities and/or storage capabilities provided across multiple devices). The implementation of the database 130 and/or the hardware components 132a-132n may be varied according to the design criteria of a particular implementation.

The service network 140 may be implemented as a server, a content delivery network and/or a cloud-based service. The service network 140 may host one or more web sites (e.g., HTML-based sites, SQL databases, etc.) 142a-142n. The web sites 142a-142n may be implemented as a companion website for the app 102. The web sites 142a-142n may offer similar functionality as the app 102. For example, the mobile app 102 may be designed (e.g., have a graphical user interface designed for smaller screen sizes, designed for touch-based control, etc.) towards mobile devices (e.g., the smartphone 100a) and the companion web sites 142a-142n may be designed (e.g., have a graphical user interface designed for larger screen sizes, designed for mouse and keyboard based control, etc.) towards desktop computers (e.g., the desktop device 100n).

The companion web sites 142a-142n may provide announcements for future product updates, future and current services and/or other types of announcements. The companion web sites 142a-142n may be configured to allow the user to log in to a user account and modify preferences and/or settings. The type of content on the web sites 142a-142n may vary according to the design criteria of a particular implementation.

Figure 2:
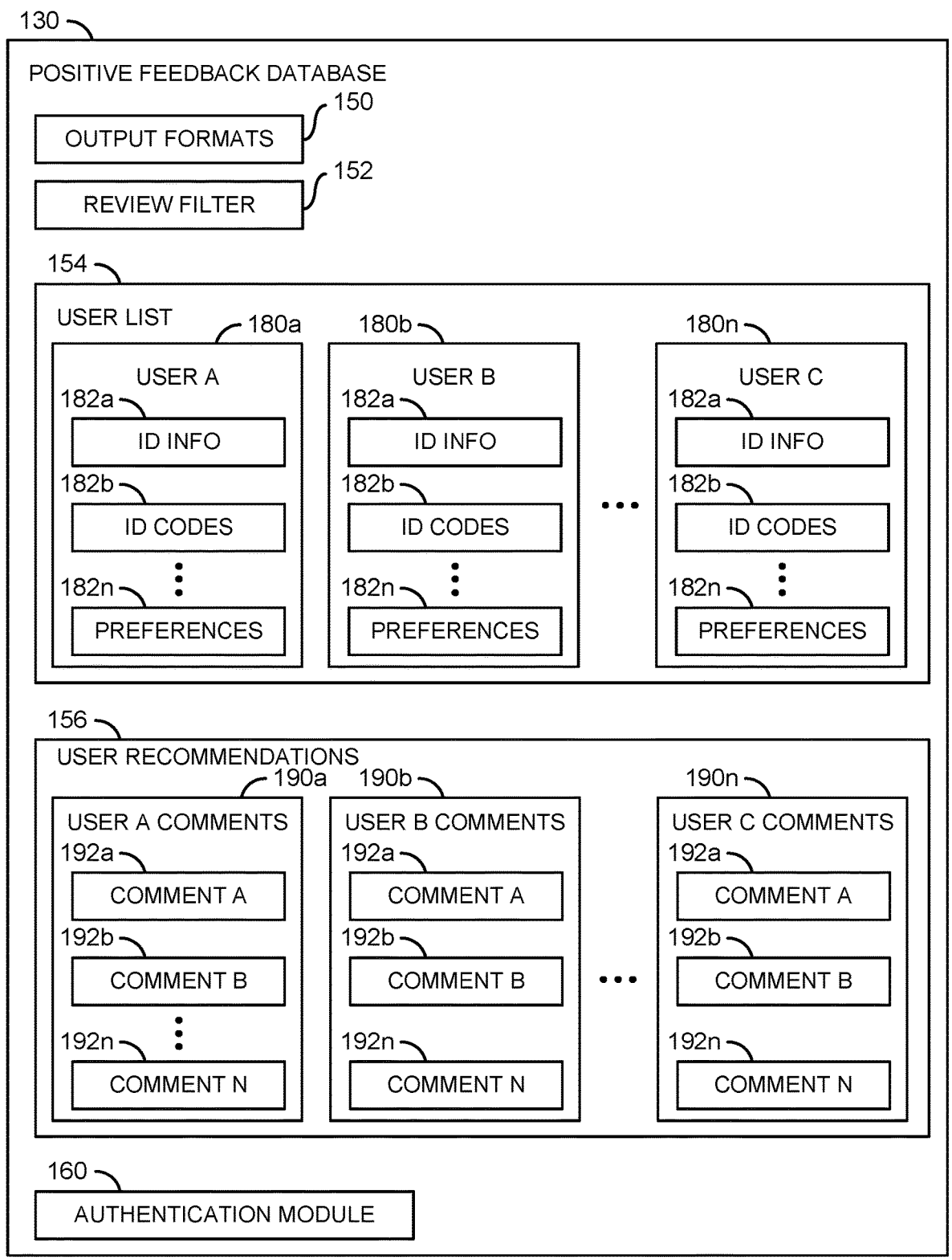
FIG. 2 is a block diagram of an example platform independent positive recommendation database.

Referring to FIG. 2, a block diagram of an example of the database 130 is shown. The database 130 may be implemented as a platform independent recommendation system database. The database 130 may comprise output formats data 150, a review filter 152, a user list 154, a user recommendation storage 156 and an authentication module 160. The user list 154 may comprise number of users 180a-180n (e.g., the account holders). Each of the users 180a-180n may comprise user data 182a-182n. The user recommendation storage 156 may comprise a number of user comments 190a-190n. Each of the user comments 190a-190n may be associated with a respective one of the users 180a-180n. Each of the user comments 190a-190n may comprise a number of comments 192a-192n. The arrangement and/or access to the data stored in the database 130 may be implemented by the computer readable instructions stored in the memory 132b and executed by the processor 132a. The database 130 may comprise other data storage (not shown). The type of data stored by the database 130 may be varied according to the design criteria of a particular implementation.

The database 130 may be used to check credentials of a user of the app 102 and/or the web sites 142a-142n (e.g., using the authentication module 160). For example, the database 130 may determine whether the user making a request is an account holder on the user list 154. The type of authentication performed may be varied according to the design criteria of a particular implementation.

The app 102 and/or the web sites 142a-142n may be configured to receive information from the users 180a-180n (e.g., an operator, the account holder, etc.). The user data 182a may comprise contact information. For example, a unique account may be created in the database 130 by the processor 132a for a user in response to receiving the contact information. The contact information may comprise one or more of a name, an email address, education level, education institution information, a professional license number, a company name where the user works, a resume, an occupation, a number of years of experience, etc. The user data 182a may further comprise employment search information. In an example, the users 180a-180n may provide job search information in the user data 182a that may be used by job recruiters to find new employees. For example, the job search information in the user data 182a may comprise an occupation type, an area and/or location desired, salary expectations, etc. The type of information stored as the user data 182a may be varied according to the design criteria of a particular implementation.

The database 130 may be configured to generate one or more unique codes for each of the users 180a-180n. In an example, the unique codes may be randomly generated by the processor 132a. The unique codes may be stored as the user data 182b (e.g., ID codes). The unique codes 182b may be associated with only one user account (e.g., each of the user account 180a-180n may be unique and each unique account may have the unique identification codes 182b). One of the unique codes 182b may be displayed by the app 102 and/or made available on the web sites 142a-142n to enable commenters to leave comments for the users 180a-180n. Another of the unique codes 182b may be displayed by the app 102 and/or made available on the web sites 142a-142n to enable the users 180a-180n and/or guests to view a read only version of the comments 192a-192n. In an example, the unique codes 182b may comprise multiple unique identification codes and/or links for each of the users 180a-180n that provide a different functionality (e.g., one unique code for leaving the comments 192a-192n, another unique code for reading the comment lists 190a-190n, etc.). The processor 132a may receive the unique code, compare the unique code received with the unique codes 182b and/or determine the functionality performed by the database 130 in response to the unique code received.

The user preferences 182n may comprise individual settings that may be selected by the users 180a-180n. Each of the users 180a-180n may select individualized settings that may affect the user experience when using the app 102 and/or the web sites 142a-142n and/or how the user data 182a-182n is used by the database 130. In one example, the user preferences 182n may enable the users 180a-180n to change user experience settings such as language, display settings (e.g., select a dark mode interface), fonts and/or layout settings for displaying the user comments 190a-190n, etc. In another example, the user preferences 182n may enable the users 180a-180n to set the account to a private mode or a public mode. In yet another example, the user preferences 182n may enable the users 180a-180n to select various filter options for the comments 190a-190n (e.g., filter out inappropriate language, automatically remove negative comments, etc.). In still another example, the user preferences 182n may enable the users 180a-180n to select which of the social media servers 110a-110n may have access to the comments 190a-190n. The types of settings that may be modified by the user in the user preferences 182n may be varied according to the design criteria of a particular implementation.

The user comments 190a-190n may be associated with one of the users 180a-180n. For example, the user comments 190a may be the comments associated with the user 180a. In one example, each of the other users 180b-180n may provide the comments 192a-192n for the user 180a. In another example, guests (e.g., people not in the user list 154) may provide the comments 192a-192n.

The comments 192a-192n may comprise positive feedback about the associated users 180a-180n (e.g., an operator of the app 102 and/or the web sites 142a-142n). In some embodiments, the comments 192a-192n may be received from the other users of a platform independent feedback network 50. In some embodiments, the comments 192a-192n may be received from anyone (e.g., even guest commenters that do not have an account in the platform independent feedback network 50). The comments 192a-192n may comprise an authentication from the user that provided the particular comment. For example, the contact information 182a (e.g., an email address) of the user 180b may be used to verify that the comment 192a for the user 180a has been legitimately provided by the user 180b. For example, the operator of the app 102 may be both a recipient of comments and a provider of comments. Similarly, an email address or a phone number may be used to authenticate the comments 192a-192n provided by a guest commenter.

The comments 192a-192n may be displayed by the app 102 and/or the web pages 142a-142n. For example, the app 102 and/or the web pages 142a-142n may implement an application programming interface (API) that may access the comments 192a-192n from the database 130. The comments 192a-192n may be displayed if approved by the associated one of the users 180a-180n that received the comments 192a-192n. For example, the users 180a-180n may delete a comment (e.g., a negative comment, a profane comment, a trolling comment, etc.).

The comments 192a-192n may comprise positive feedback. In one example, the positive feedback may comprise a personalized message by one of the users 180a-180n about a performance of another one of the users 180a-180n. In another example, the positive feedback may comprise a personalized message from a guest (e.g., a non-account holder) about one of the users 180a-180n. For example, one of the comments 192a-192n may be a recommendation and/or positive feedback about a service provided by one of the users 180a-180n. In one example, the user 180b may be a patient that receives physiotherapy treatment as a service from the user 180a. The user 180b may leave the positive message (or a recommendation, or a suggestion for improvement) about the physiotherapy treatment provided by the user 180a (e.g., one of the comments 192a-192n of the user comments 190a that corresponds to the user 180a). In another example, the patient that receives physiotherapy treatment as a service from the user 180a may not be one of the users 180a-180n. The patient may be able to provide a positive message (e.g., one of the comments 192a-192n) about the physiotherapy treatment from the user 180a, without being one of the users 180a-180n.

The user preferences 182a-182n may enable the users 180a-180n to set the account to either a private mode or a public mode. If the user preferences 182a-182n have the account set to the private mode, then the one of the comment lists 190a-190n associated with the one of the users 180a-180n with the private mode setting may not appear on the web sites 142a-142n. For example, when guests or other of the users 180a-180n search the database 130 of the platform independent positive recommendation system 50, the comment lists 190a-190n of the users 180a-180n that have the user preferences 182n that set the account to the private mode may be filtered out by the processor 132a and may not be displayed. If the user preferences 182-182n have the accounts set to the public mode, then the one of the comment lists 190a-190n associated with the one of the users 180a-180n with the public mode setting may appear on the web sites 142a-142n. For example, when guests or other of the users 180a-180n search the database 130 of the platform independent recommendation system 50, the comment lists 190a-190n of the users 180a-180n that have the user preference 182 that set the account to the public mode may be displayed.

The output formats 150 may comprise options for outputting the comments 192a-192n. Generally, the comment lists 190a-190n may be viewed online by using the app 102 and/or accessing the web sites 142a-142n with one of the devices 100a-100n. The output formats 150 may provide formatting information for displaying the comment lists 190a-190n in a computer readable and/or web-based format. The output formats 150 may further comprise hard copy formats. For example, the users 180a-180n may order physical copies of the comments 192a-192n (or other people may order physical copies of the comments 192a-192n for one of the users 180a-180n). The output formats 150 may enable the comments 192a-192n to be formatted and provided as a gift for the users 180a-180n (e.g., a retirement gift). In one example, the output formats 150 may comprise a hard copy of a book format for the comments 192a-192n. In another example, the output formats 150 may comprise a framed poster format for the comments 192a-192n. In yet another example, the output formats 150 may comprise an engraved plaque format for the comments 192a-192n. The type of formats and/or the types of formats available in the output formats 150 may be varied according to the design criteria of a particular implementation.

In some embodiments, the review filter 152 may be configured to pre-screen comments to delete negative comments and/or ensure that only positive comments displayed. In one example, the review filter 152 may implement an artificial intelligence model. In some embodiments, the artificial intelligence model for the filter 152 may be implemented by a processor (or processors) 132a and/or the memory 132b implemented by the platform independent recommendation server 120. In some embodiments, the artificial intelligence model for the filter 152 may be implemented by a cloud computer service (e.g., a server-based computing service that provisions access to processing and/or memory resources that may scale based on demand) accessed by the platform independent recommendation server 120. The filter 152 may be configured to scan and/or parse the text of the comments 192a-192n provided, learn which types of language and/or phrases are positive comments and negative comments, and then allow the comments 192a-192n that are determined to be positive and delete (or flag) the comments 192a-192m that are determined to be negative. The artificial intelligence model for the filter 152 may be configured to learn based on feedback from the users 180a-180n (e.g., a comment that is flagged as negative may be approved by one of the users 180a-180n, and the artificial intelligence model may provide negative feedback to the artificial intelligence model to prevent similar mistakes in the future).

Figure 3:
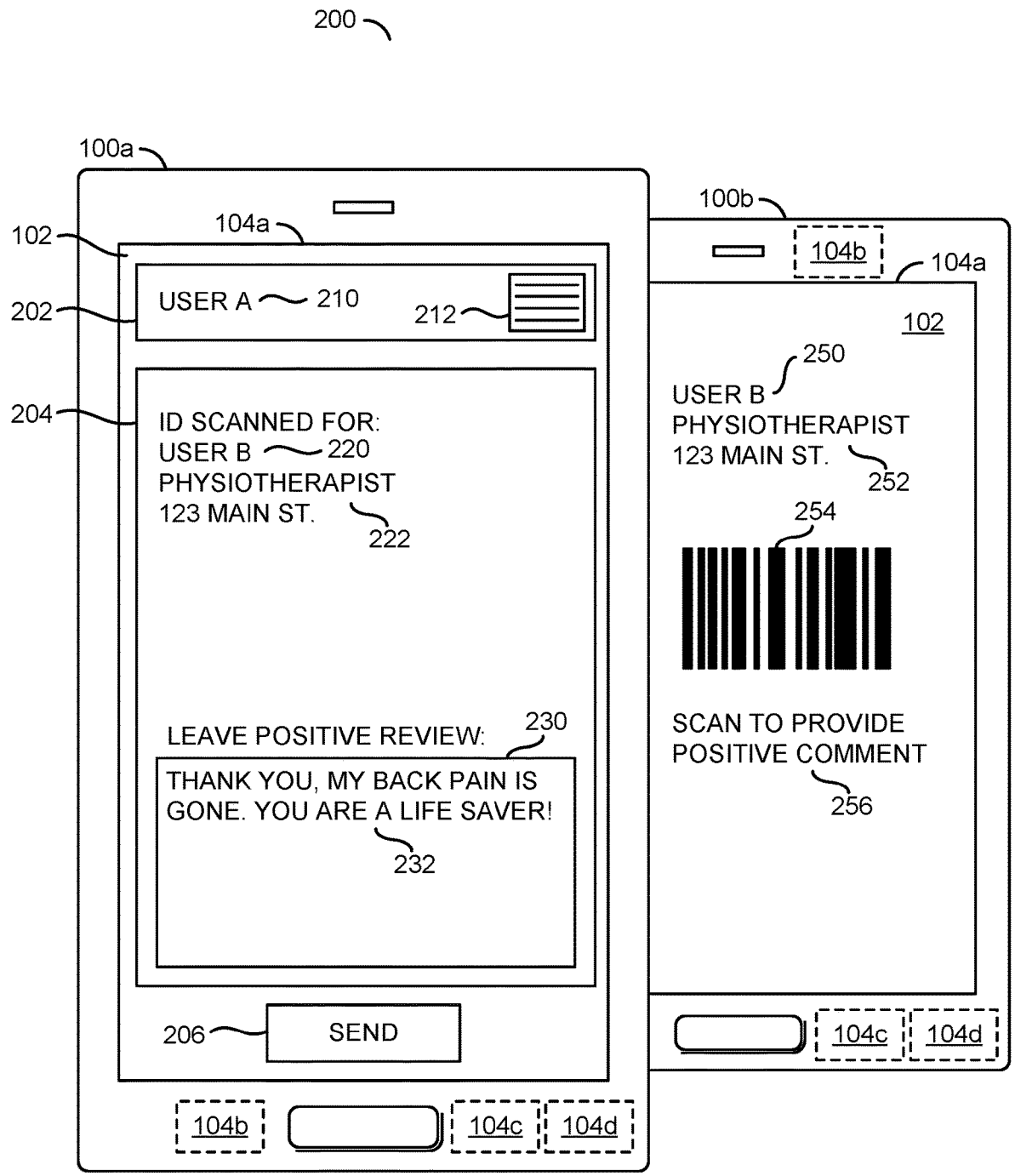
FIG. 3 is a diagram of a mobile application that may enable scanning a user code to provide a positive recommendation.

Referring to FIG. 3, a mobile application that may enable scanning a user code to provide a positive recommendation is shown. A commenting interaction 200 is shown. The commenting interaction 200 may comprise two of the mobile devices 100a-100n. The mobile device 100a and the mobile device 100b are shown as representative examples for providing a positive recommendation in the commenting interaction 200.

The mobile device 100a and the mobile device 100b are shown comprising the hardware components 104a-104d. The hardware components 104a-104d may be representative examples of the hardware components 104a-104n shown in association with FIG. 1. The hardware component 104a may comprise a touchscreen interface. The touchscreen interface 104a may enable the mobile devices 100a-100n to display output and/or receive touch input. The hardware component 104b may comprise a processor. The hardware component 104c may comprise a memory. The processor 104b and the memory 104c may enable the mobile devices 100a-100n to store and/or execute computer readable instructions (e.g., enable the app 102). The hardware component 104d may comprise a camera and/or scanning device. The camera 104d may enable the mobile devices 100a-100n to capture images and/or scan the unique codes 182b. The devices 100a-100n may comprise other hardware components 104a-104n. The design, functionality and/or arrangement of the hardware components 104a-104n of the devices 100a-100n may be varied according to the design criteria of a particular implementation.

The mobile device 100a and the mobile device 100b are each shown running the mobile app 102. The app 102 is shown displayed on the interface 104a. The app 102 may be executed on the mobile device 100a used by one of the users (or a guest) providing one of the comments 192a-192n. The app 102 may be executed on the mobile device 100b used by one of the users 180a-180n receiving one of the comments 192a-192n. While the example commenting interaction 200 is shown being performed using the mobile devices 100a-100b and the mobile app 102, the comments 192a-192n may be similarly left and/or viewed using the web sites 142a-142n (e.g., with one or more of the devices 100a-100n being a desktop computer, a laptop computer, etc.). The types of devices used for leaving the comments 192a-192n may be varied according to the design criteria of a particular implementation.

The mobile device 100a may scan the mobile device 100b to enable the operator of the mobile device 100a to provide one of the comments 192a-192n for the operator of the mobile device 100b. The scan may authenticate the comments 192a-192n received and/or ensure that the comments 192a-192n are provided to the intended recipient (e.g., to the appropriate one of the comment lists 190a-190n for the corresponding one of the users 180a-180n). The app 102 may be configured to perform different functionality depending on whether the user is leaving one of the comments 192a-192n or receiving one of the comments 192a-192n.

The app 102 executed by the mobile device 100a may include a number of sections, such as an operator section 202, a commenting section 204 and/or a send button 206. The operator section 202 may provide the user name 210 and/or a submenu 212 for settings and/or other options. The commenting section 204 may comprise a recipient account name 220 and address 222 of the comment recipient. A comment box 230 may enable the operator of the mobile device 100a to leave a comment 232.

The operator section 202 may provide user information about the person leaving one of the comments 192a-192n. In one example, if the person leaving one of the comments 192a-192n is one of the users 180a-180n in the database 130, then the user name 210 may be displayed. In another example, if the person leaving one of the comments 192a-192n is not one of the users 180a-180n (e.g., a guest commenter), then the user name 210 may be a guest. In some embodiments, the guest commenter may enter an email address to authenticate the comments 192a-192n left and the user name 210 may provide the email address entered by the guest. The submenu 212 may provide other options for the mobile app 102 (e.g., access to the user preferences 182n).

The commenting section 204 may enable the person to leave one of the comments 192a-192n. The recipient account name 220 may provide an indication of the user account 180a-180n that the comments 192a-192n will be submitted to. The recipient account name 220 may further provide additional information from the ID info 182a (e.g., an occupation, a type of service provided, a fee charged, etc.). The address 222 may provide additional information about the person receiving the comments 192a-192n. The recipient account name 220 and the address 222 may enable the person leaving the comment (e.g., the user of the mobile device 100a) to confirm that the intended person will receive the comment (e.g., a person visiting the office of a physiotherapist may double-check that the correct name of the physiotherapist is shown and the address of the physiotherapist is shown before leaving one of the comments 192a-192n).

The positive feedback 232 is shown in the comment box 230. The comment box 230 may provide a free-form text entry to enable the person to leave the positive feedback 232. In some embodiments, the comment box 230 may enable free-form text entry so that the commenter may leave any comment desired. In some embodiments, the comment box 230 may be pre-populated with suggested comments. The positive feedback 232 may be applied to the comment list 190a-190n of one of the user accounts 180a-180n (e.g., as indicated by the recipient account name 220 and the address 222). In some embodiments, the comment box 230 may enable voice input. In some embodiments, the comment box 230 may enable drawn input (e.g., using a stylus and/or a finger to draw and/or write a comment). The method of providing the positive feedback 232 may be varied according to the design criteria of a particular implementation.

The send button 206 may submit the positive feedback 232. In response to the send button 206, the mobile app 102 may communicate the positive feedback 232 to the platform independent recommendation server 120 for storage in the database 130. The memory 132b may store the received positive feedback 232 and the processor 132a may execute the computer readable instructions to determine which of the users 180a-180n that the positive feedback 232 applies to and/or the authentication by accessing the authentication module 160. If authentication module 160, authenticates the positive feedback 232, then the database 130 may associate the submitted positive feedback 232 to one of the user accounts 180a-180n. The submitted positive feedback 232 may be added as a next one of the comments 192a-192n in the appropriate one of the comment lists 190a-190n.

The app 102 executed by the mobile device 100b may include a user name 250 and an address 252 of the comment recipient. A unique code 254 is shown. Instructions 256 are shown to inform the operator of the mobile device 100a how to leave the comment 232 for the comment recipient.

The app 102 executed by the mobile device 100b may be the mobile device used by the comment recipient (e.g., one of the users 180a-180n). The user name 250 may be the same user name in the ID info 182a of the database 130. The address 252 may be the same user address information in the ID info 182a of the database 130. The user name 250 and the address 252 may provide a visual and human readable indication that the unique code 254 belongs to the expected person (e.g., the intended comment recipient). For example, if one of the devices 100a-100n is a shared device (e.g., used by multiple users), the user name 250 and the address 252 may provide an indication of which of the users 180a-180n is logged in and presenting the unique code 254. The user name 250 and the address 252 may further provide a double-check for the commenter to ensure that the appropriate one of the users 180a-180n will receive the comment 232. For example, before submitting the comment 232, the commenter may compare to the user name 250 and the address 252 to the recipient account name 220 and the address 222 displayed on the mobile device 100a to ensure that the user information matches (e.g., to confirm that the intended person will receive the comment 232).

The unique code 254 is displayed by the app 102. The unique code 254 may correspond to one of the ID codes 182b (e.g., the code that corresponds to leaving comments) associated with one of the user accounts 180a-180n. The app 102 and/or one of the websites 142a-142n may be configured to generate the visual display of the unique code 254 in response to the ID codes 182b of the users 180a-180n. For example, the unique code 254 may be one of the unique ID codes 182b for the one of the user accounts 180a-180n with the user name 250 (e.g., in the example shown, the user B may be the user 180b and the unique code 254 may correspond to one of the unique ID codes 182b of the user 180b). In the example shown, the unique code 254 may be a barcode. In some embodiments, the unique code 254 may be a QR code and/or a link (e.g., URL). Generally, the unique code 254 may be any type of scannable code. For example, the camera/scanner 104d of the mobile device 100a may be configured to perform a scan of the unique code 254. In some embodiments, the unique code 254 may be a communicated signal (e.g., an encrypted signal such as a Bluetooth signal that may be read by one of the hardware components 104a-104n configured to implement a communication device). The implementation of the unique code 254 to provide one of the ID codes 182b associated with one of the user accounts 180a-180n in the database 130 may be varied according to the design criteria of a particular implementation.

The instructions 256 may provide basic instructions to inform the commenter how to leave the comment 232 for a particular one of the users 180a-180n using the app 102. In an example, the unique code 254 may enable the commenter to directly reach the profile of the comment recipient (e.g., the profile for the user 180b) and leave a comment (e.g., one of the comments 192a-192n for the comment list 190b).

If the comment recipient has a private profile, the commenter may not be able to see any previous comments. In some embodiments, the commenter may be able to leave a comment by clicking and/or engaging with a link on a company web site to find the particular user and review or comment. For example, the unique code 254 may be embedded in an HTML link. When commenting, the commenter may be able to see a name, photo, occupation and/or where the comment recipient works (e.g., depending upon the user preferences 182n of the comment recipient). The commenter (e.g., reviewer) may provide name and email address for identification and/or authentication of the comment.

The commenter may follow the instructions 256 and use the mobile device 100a that is executing the app 102 in order to leave the comment 232. The commenter may use the camera/scanner hardware 104d of the mobile device 100a to read the unique code 254 displayed by the app 102 operating on the mobile device 100b of the comment recipient (e.g., one of the users 180a-180n). In some embodiments, the unique code 254 may provide an automatic authentication with the authentication module 160 of the database 130 to enable the mobile device 100a to write data to the one of the comment lists 190a-190n of the user associated with the particular unique code 254.

In response to reading the unique code 254, the app 102 operating on the mobile device 100a may automatically populate the commenting section 204 with the recipient account name 220 and/or the address 222. For example, the app 102 may read the data from the unique code 254 scanned by the camera/scanner hardware 104d and output the information as the recipient account name 220 and/or the address 222. In one example, the unique code 254 may encode the user name 250 and/or the address 252 and the information may be read directly from the unique code 254. In another example, the unique code 254 may provide an authenticated link to the database 130. The mobile device 100a may communicate the scanned unique code 254 to the platform independent positive recommendation server 120 and the processor 132*a* may compare the scanned unique code 254 to the user ID codes 182*b*. In response to a match, the processor 132*a* may retrieve from the database 130, the ID info 182*a*. The processor 132*a* may retrieve the data from the database 130 and the communication device 132*c* may communicate the user ID info 182*a* for the particular one of the user accounts 180*a*-180*n* that is associated with the one of the unique ID codes 182*b* that matches the unique code 254 that was scanned to the mobile device 100*a*. The recipient account name 220 and/or the address 222 may match the user name 250 and the address 252 displayed near the unique code 254.

After the commenting section 204 has been populated with the information based on the unique code 254 that was scanned, the comment box 230 may be available for the commenter to add the comment 232. The comment 232 may be uploaded to the database 130. The comment 232 may be added to the comment list 190*b* associated with the user 180*b* (e.g., the particular one of the users 180*a*-180*n* that has the comment version of the unique ID codes 182*b* that matches the unique code 254).

Figure 4:
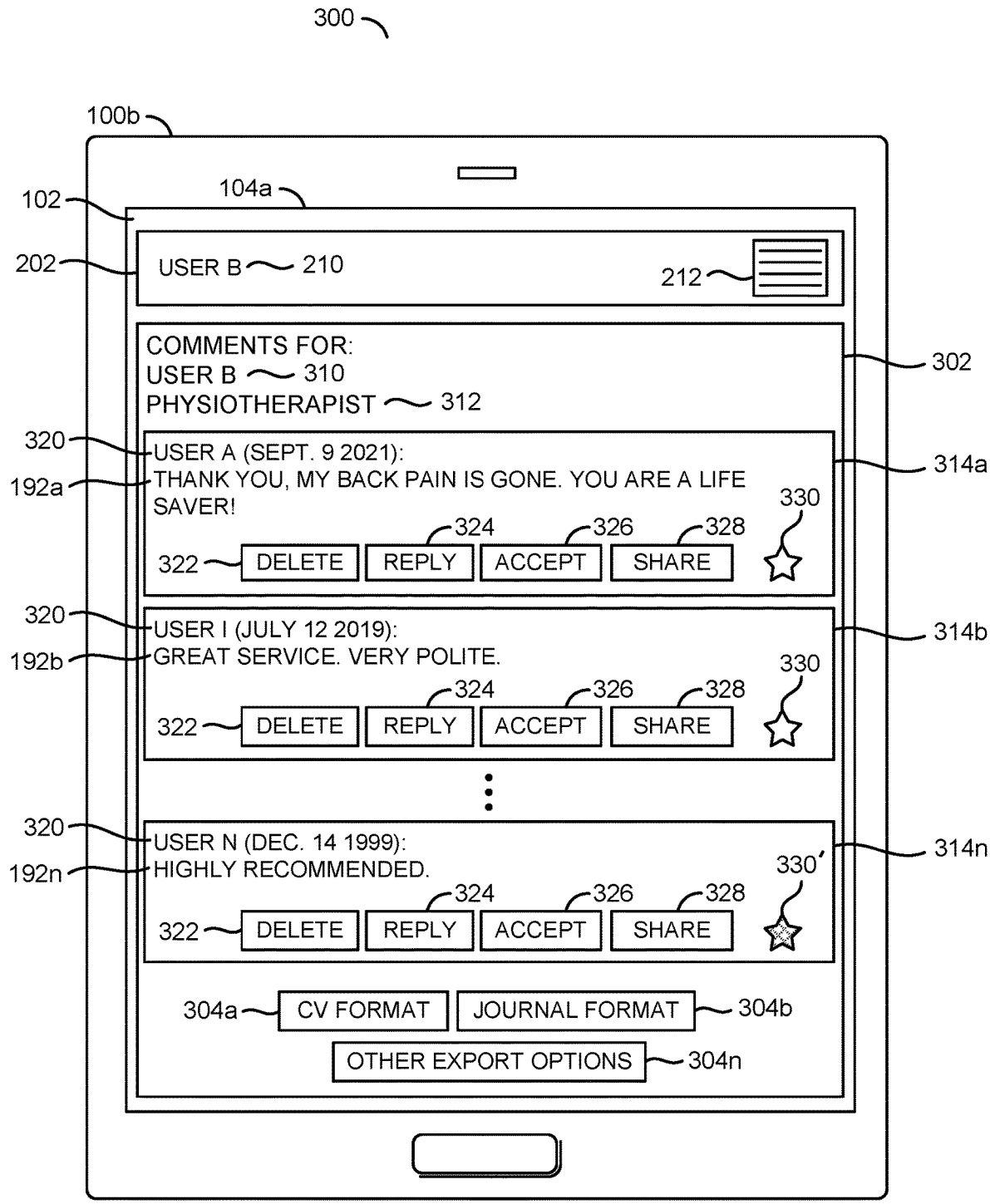
FIG. 4 is a diagram of a mobile application displaying a chronological comment list.

Referring to FIG. 4, a diagram of a mobile application displaying a chronological comment list is shown. The comment list is shown in an example context 300 of a mobile app running on a user device 100*b*. In the example shown, the user device 100*b* may be a tablet computing device. The tablet computing device 100*b* is shown running the app 102. The touchscreen display 104*a* of the tablet computing device 100*b* may display the output of the app 102 and/or receive input from the user (e.g., one of the users 180*a*-180*n*). The app 102 may comprise the operator section 202, a comment display section 302 and/or output options 304*a*-304*n*. The example context 300 may provide a representative example of viewing the comment lists 190*a*-190*n* using the app 102. However, the comment lists 190*a*-190*n* may also be viewed using one of the web sites 142*a*-142*n*. The particular method of display, design of the display and/or arrangement of the display of the comment lists 190*a*-190*n* may be varied according to the design criteria of a particular implementation.

The operator section 202 may be similar to the operator section 202 described in association with FIG. 3 (e.g., providing the user name 210 and the settings submenu 212). The operator section 202 may provide user information about the particular one of the users 180*a*-180*n* that is viewing the associated one of the comment lists 190*a*-190*n* using the app 102. In one example, if the person viewing the comments 192*a*-192*n* is one of the users 180*a*-180*n* in the database 130, then the user name 210 may be displayed. In another example, if the person viewing the comments 192*a*-192*n* is not one of the users 180*a*-180*n* (e.g., a guest viewer reading a public profile of one of the users 180*a*-180*n*), then the user name 210 may be a guest. In the example shown for the example context 300, the user 210 may be the user B (e.g., the user 180*b*) that is viewing their own comment list (e.g., the comment list 190*b*). When one of the users 180*a*-180*n* uses the app 102 to view their own comment list, the users 180*a*-180*n* may have additional editing options that may not be available to another one of the users (or a guest) that is merely viewing the comments 192*a*-192*n*.

The comment display section 302 may comprise the user name 310 of the operator and/or the occupation 312 of the operator. For example, one of the users 180*a*-180*n* may have a separate comment display output for multiple options (e.g., the user 180*b* may receive comments for one job as a physiotherapist and the same user 180*b* may receive separate comments for another job as a music instructor). The user name 310 and/or the occupation 312 may be information about the user 180*b* received from the user ID info 182*a*.

The comment section 302 may comprise the chronological comments 314*a*-314*n*. The app 102 may be configured to display the comment list 190*b* of the user 180*b* arranged in a chronological order (e.g., from new to old). The app 102 (or the web pages 142*a*-142*n*) may be configured to read the comment lists 190*a*-190*b* of the users 180*a*-180*n*. For example, when the user 180*b* logs into the app 102, the memory 132*b* may temporarily store the login credentials and the processor 132*a* may use the authentication module 160 to read the credentials provided by the operator of the mobile device 100*b* (e.g., a user name, an email address, a password, a two-factor authentication provided by the user 180*b*). After the authentication module 160 authenticates the credentials provided by the user 180*b*, the database 130 may retrieve the user ID info 182*a* for the user 180*b* and the comments 192*a*-192*n* stored in the comment list 190*b*. The information retrieved from the database 130 about the user 180*b* may be communicated by the communication device 132*c* to the tablet computing device 100*b*. The processor 104*b* of the tablet computing device 100*b* may be configured to execute the computer readable instructions of the app 102 to enable the output of the user name 310, the occupation 312 and/or format the comments 192*a*-192*n* of the comment list 190*b* as the chronological comments 314*a*-314*n*. The display format of the chronological comments 314*a*-314*n* may be one example output. The app 102 may display the comment list 190*b* in various output formats (e.g., the format may change after the app 102 is updated, the format may be adjusted based on the user preferences 182*n*, the format may be adjusted based on the viewport size of the user devices 100*a*-100*n*, etc.). The display of the comment lists 190*a*-190*n* may be varied according to the design criteria of a particular implementation.

Each of the chronological comments 314*a*-314*n* may comprise comment information 320 and one of the comments 192*a*-192*n* associated with the particular one of the users 180*a*-180*n*. In the example shown, the comment list 190*b* may be displayed for the user 180*b* and the first chronological comment 314*a* may display the comment 192*a*, the second chronological comment 314*b* may display the comment 192*b*, etc. The comment information 320 may be stored as metadata for the comments 192*a*-192*n*. In the example shown, the comment information 320 may comprise a user name and a date that the comment was provided. Generally, the user name may be displayed for all of the comments 192*a*-192*n* but the email address of the commenter may be kept private. In an example, if the commenter is one of the users 180*a*-180*n*, the user name in the corresponding one of comments 192*a*-192*n* may provide a link to enable viewing the profile of the one of the users 180*a*-180*n* that provided the comment (e.g., if the profile of the commenter is set to a public profile). The date may be used to organize the comments 192*a*-192*n* in the chronological order used for the chronological comments 314*a*-314*n*.

Each of the chronological comments 314*a*-314*n* may comprise comment options 322-330. The comment option 322 may be a delete option. The comment option 324 may be a reply option. The comment option 326 may be an accept option. The comment option 328 may be a share option. The comment option 330 may be a promote option. Other comment options may be implemented (not shown). The number, type and/or arrangement of the comment options 322-330 may be varied according to the design criteria of a particular implementation.

The comment options 322-330 may enable the user to delete comments (e.g., remove an undesired, trolling or profane comment), reply to a comment, share comments with others and/or organize the display of the comments 192a-192n. The delete option 322 may enable each individual user to delete comments that they do not like (e.g., delete for any reason). For example, the delete option 322 may allow the user 180b to delete negative comments. The users 180a-180n may have unrestricted access for deleting any of the comments 192a-192n.

The reply option 324 may enable the users 180a-180n to contact a person that left one of the comments 192a-192n. For example, the users 180a-180n may reply to the commenter to clarify a comment, remove slang, remove profanity, fix typos, etc. In one example, the reply option 324 may be used to thank the commenter for leaving one of the comments 192a-192n. In some embodiments, the users 180a-180n may provide suggestions for particular edits to the comments that may be sent to the commenter for approval. For example, the user 180b may identify a spelling error in the comment 192a and the app 102 may provide an interface for entering a suggested edit for the comment 192a. The suggested comment may be sent to the commenter (e.g., the user 180a). The commenter may review the suggested edit and approve or deny the edit. If the edit is approved, the edited information may be communicated to the platform independent positive recommendation server 120 and the processor 132a may select the matching one of the comments 192a-192n for the edit and update the edited one of the comments 192a-192n. Each of the users 180a-180n that receives a comment may not edit the comment but may have the option to delete an undesired comment or have an option to reply under the particular comment if they found there is some spelling correction or to show gratitude, etc. The platform independent recommendation server 120 may automatically send an email to the commenter about a reply from the user 180b. If the commenter does not respond to a reply, the user 180b may either leave the comment as is, or delete the comment using the delete option 322.

The accept option 326 may enable the users 180a-180n to accept the comment so that the comment is displayed as part of the comment lists 190a-190n. In an example, as shown in association with FIG. 3, the commenter may submit the comment 232, which may upload the comment 232 to the database 130. After the comment 232 has been uploaded, the comment 232 may be added to the appropriate one of the comment lists 190a-190n as one of the comments 192a-192n. The newly submitted comment 232 may not be publicly displayed until the associated one of the users 180a-180n approves the comment 232. In the example shown, the chronological comment list 314a-314n may comprise a private view of the comment list 190b for the user 180b. The private view may not be the same view that other users may see when searching the platform independent recommendation server 120. After the user 180b approves one or more of the comments 192a-192n using the accept option 326, then the comments 192a-192n that have been approved may be displayed publicly. Similarly, only the comments 192a-192n that have been approved of by the users 180a-180n may be presented in one of the output formats (e.g., the hard copy journal, the hard copy book, the hard copy poster, etc.).

The share option 328 may enable the user 180b to share any of the comments 192a-192n on various platforms. For example, when the user 180b selects the share option 328, the app 102 may provide various options to share the selected one of the comments 192a-192n. For example, the social media servers 110a-110n may provide various APIs to enable the comments 192a-192n to be posted to the social media platforms provided by the social media servers 110a-110n. In some embodiments, the user preferences 182n may store encrypted login credentials for the social media servers 110a-110n to enable the comments 192a-192n to be shared automatically (or without a separate login). In an example, the share option 328 may enable the comments 192a-192n to be shared via Facebook, Twitter, WhatsApp, TikTok, Instagram, text messages, etc. The available social media platforms for sharing and/or the backend communication for enabling sharing to the available social media platforms may be varied according to the design criteria of a particular implementation.

The promote option 330 may enable the users 180a-180n to promote one or more of the comments 192a-192n. Promoted comments may be elevated to more prominent locations for viewing. For example, the chronological comments 314a-314n may display the comments 192a-192n according to the date received with the newest comments displayed first. For example, the comment 192a may be the most recent comment, which may appear at the top of the chronological comments 314a-314n. Selecting the promote option 330 may move the selected comment above the chronological comment 314a. In some embodiments, promoted comments may be highlighted and/or have a different design style applied to provide a more prominent view of the promoted comment. In the example shown, the promote option 330 may be a star icon. Other types of icons may be implemented (e.g., a thumbs up, an up arrow, etc.).

In the example shown, the promote option 330' for the comment 192n may be selected. Without promotion, the comment 192n may be the last of the chronological comments 314a-314n (e.g., the earliest date received). Selecting the promote option 330' may bump the comment 192n to the top location (e.g., before the comment 192a). The promote option 330' is shown filled in to indicate that the comment 192n has been selected as a promoted comment.

The comments 192a-192n may further comprise authentication information. The authentication information may comprise an email address and/or a login through various services (e.g., Facebook login, Google login, an iCloud login, etc.). The authentication may provide a verification that a comment has been provided by a person. If the commenter is one of the users 180a-180n, then the user account verification may provide the authentication. If the commenter is not one of the users 180a-180n (e.g., a guest commenter), then the contact information (e.g., a name, an email address, a phone number, etc.) may be used as the authentication to enable the commenter to provide a comment without creating an account in the database 130 (e.g., remove a potential barrier to providing comments).

Generally, guests that provide a comment may not be contacted by the users 180a-180n. For example, in the chronological comments 314a-314n the comment information 320 may not provide a name or a method of contacting the guest commenter. If the guest commenter cannot be contacted, the users 180a-180n may not have the reply option 324. For example, with a guest commenter, the users 180a-180n may have the delete option 322 to delete an undesired comment or the accept option 326 to add the comment to the comment lists 190a-190n.

The users 180a-180n may select the profiles to be public or private. Public profiles may enable the comments 190a-190n to be displayed publicly (e.g., for anyone to view). For example, with a public view, the users 180a-180n may send the comment lists 190a-190n to other people (e.g., via the link and/or one of the ID codes 182*b*) and/or the comment lists 190*a*-190*n* may be displayed in response to a search made using the platform independent recommendation server 120. When displayed publicly, the contact information for the authentication may not be output. Private profiles may only be viewable by the user that received the comments. For example, if the user 180*b* sets the profile to private, then only the user 180*b* may view the comment list 190*b*. In some embodiments, the users 180*a*-180*n* may directly send the comment lists 190*a*-190*n* of a private account using one of the unique ID codes 182*b*, but the comment lists 190*a*-190*n* may not be otherwise accessible by searching the platform independent recommendation server 120.

In the example shown, the comments 192*a*-192*n* may be displayed in the chronological order. In some embodiments, the comments 192*a*-192*n* may be displayed using different colors and/or badges along with the comment section. For example, each of the comments 192*a*-192*n* may be in different color and/or colored based on category, time, etc. Comments that have been edited may be highlighted to indicate that edits have been made. The display and/or style of the output of the comments 192*a*-192*n* may be varied according to the design criteria of a particular implementation.

The output options 304*a*-304*n* may enable the comments to be output into various formats. The output options 304*a*-304*n* may be provided based on the output formats 150 provided by the database 130. The output option 304*a* may be a CV format (or resume format). For example, if the user 180*b* wants the comments 192*a*-192*n* attached to a resume then, the output format 304*a* may enable the user 180*b* to print or email an electronic copy of a resume with the comments 192*a*-192*n* attached. Formats may comprise cloud services such as AWS, Google or Microsoft OneDrive for storage.

The output option 304*b* may be a journal format. The journal format 304*b* may comprise a hard copy (e.g., printed version) of the comments 192*a*-192*n*. In an example, the journal format 304*b* may provide a book version of the comments 192*a*-192*n*. For example, the book version of the comments 192*a*-192*n* may be provided as a retirement gift. Selecting the journal format 304*b* may provide additional options (e.g., hard cover, paperback, color options, font options, cover/title options, etc.). In some embodiments, selecting the journal format 304*b* may direct the users 180*a*-180*n* to a webshop provided by the platform independent positive feedback server 120. The webshop may comprise pricing for various book option (e.g., a hard cover option may be a more expensive option than a paperback).

The other export options 304*n* may be provided. In one example, the other export options 304*n* may comprise a poster. A poster option may provide all the comments 192*a*-192*n* or a subset of the comments 192*a*-192*n* (e.g., a single poster may have limited space for displaying the comments 192*a*-192*n*). For example, the poster option may display the comments 192*a*-192*n* that have been promoted using the promote option 330. The number and/or types of the export options 304*a*-304*n* may be varied according to the design criteria of a particular implementation.

In response to receiving a selection of one of the export options 304*a*-304*n*, the processor 132*a* may access the comments 192*a*-192*n* for the particular one of the users 180*a*-180*n* in the database 130. The processor 132*a* may export the comments 192*a*-192*n* into the particular format defined by the output formats 150 that matches the selection of the export options 304*a*-304*n*. The comments exported into the output formats 150 may be used to generate the particular output format (e.g., to print to the journal format, to print a poster, machine codes for engraving to a plaque, etc.). The processor 132*a* may retrieve the user information 182*a* (e.g., a mailing address) to generate a shipping label for the hard copy version of the comments 192*a*-192*n* produced.

Figure 5:
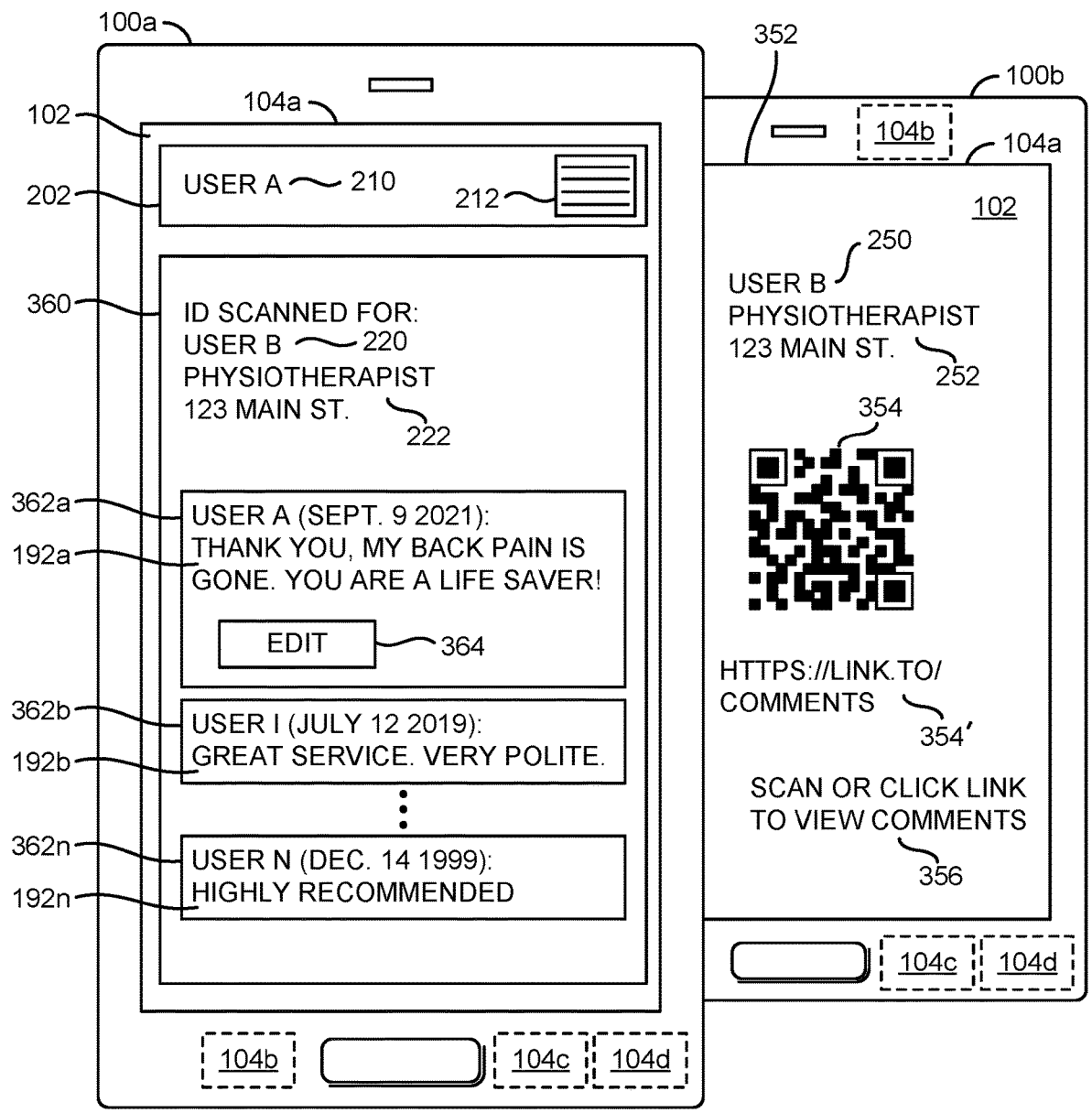
FIG. 5 is a diagram of a mobile application that may enable scanning a user code to view a comment list.

Referring to FIG. 5, a diagram of a mobile application that may enable scanning a user code to view a comment list is shown. A comment list sharing interaction 350 is shown. The comment list sharing interaction 350 may comprise two of the mobile devices 100*a*-100*n*. The mobile device 100*a* and the mobile device 100*b* are shown as representative examples for sharing one of the comment lists 190*a*-190*n* in the comment sharing interaction 350. The mobile device 100*a* and the mobile device 100*b* may have a similar implementation as described in association with FIG. 3. For example, the mobile devices 100*a*-100*b* are shown comprising the touchscreen interface 104*a*, the processor 104*b*, the memory 104*c* and/or the scanning device 104*d* and may be executing the app 102.

For the comment list sharing interaction 350, the mobile device 100*a* may scan the mobile device 100*b* to enable the operator of the mobile device 100*a* to view a read only version of the one of the comment lists 190*a*-190*n* associated with the one of the users 180*a*-180*n* that is the operator of the mobile device 100*b*. The scan may provide a direct link to the comments 192*a*-192*n* and/or ensure that the comments 192*a*-192*n* are displayed to the intended recipient (e.g., to the appropriate one of the comment lists 190*a*-190*n* for the corresponding one of the users 180*a*-180*n*).

The app 102 executed by the mobile device 100*b* may be the mobile device used by the comment sharer (e.g., one of the users 180*a*-180*n*). The user name 250, the address 252, a unique share code 354, a unique share link 354' and/or share instructions 356 are shown. The unique share code 354 is shown as a QR code. The unique share link 354' is shown as a URL. In some embodiments, the unique share code 354 may comprise a barcode.

The unique share code 354 and/or the unique share link 354' are each displayed by the app 102. While both the unique share code 354 and the unique share link 354' are shown for illustrative purposes for the comment list sharing interaction 350, generally only the unique share code 354 may be displayed for scanning with the mobile device 100*a*. The unique share code 354 and/or the unique share link 354' may correspond to one of the ID codes 182*b* (e.g., the code that corresponds to sharing the comment lists 190*a*-190*n* with other people) associated with one of the user accounts 180*a*-180*n*. The app 102 and/or one of the websites 142*a*-142*n* may be configured to generate the visual display of the unique share code 354 and/or the HTML for providing the unique share link 354' in response to the ID codes 182*b* of the users 180*a*-180*n*. For example, the unique share code 354 and/or the unique share link 354' may be one of the unique ID codes 182*b* for the one of the user accounts 180*a*-180*n* with the user name 250 (e.g., in the example shown, the user B may be the user 180*b* and the unique share code 354 may correspond to one of the unique ID codes 182*b* of the user 180*b*). The interaction and/or implementation of the unique share code 354 may be similar to the unique code 254 described in association with FIG. 3.

The instructions 356 may provide basic instructions to inform the comment viewer how to view the comments 192*a*-192*n* for a particular one of the users 180*a*-180*n* using the app 102. In an example, the unique share code 354 may enable the comment viewer to directly access the comment list 190*b* of the comment sharer (e.g., the profile for the user 180*b*).

The mobile device 100*a* may scan the unique share code 354. The unique share code 354 may be a separate code from the unique code 254. For example, the ID codes 182*b* may comprise at least two unique codes. The unique code 254 may provide authentication to enable people to provide the comment 232. The unique share code 354 and/or the unique share link 354' may provide an authenticated link to enable people to view a read only version of the comments 192*a*-192*n* of a particular one of the users 180*a*-180*n*. In the example shown, the mobile device 100*a* may be operated by one of the users 180*a*-180*n* (e.g., the user 180*a*). However, the unique share code 354 and/or the unique share link 354' may enable anybody (e.g., a guest) to view the read only list of the comments 192*a*-192*n*.

The app 102 executed by the mobile device 100*a* may display the operator section 202 and a read only comment section 360. The read only comment section 360 may comprise the account name 220 and the address 222 of the one of the users 180*a*-180*n* that corresponds to the scanned unique share code 354 (e.g., the user 180*b* in the example shown). The read only comment section 360 may comprise a list of read only comments 362*a*-362*n*.

The read only comments 362*a*-362*n* may comprise a display of the comments 192*a*-192*n* received from the database 130 for the one of the comment lists 190*a*-190*n* that is associated with the one of the users 180*a*-180*n* with the ID codes 182*b* that matches the scanned unique share code 354. For example, the scanning device 104*d* of the mobile device 100*a* may scan the unique share code 354 and the data may be sent to the database 130 for authentication. The processor 132*a* may compare the received unique share code 354 with the ID codes 182*b* to determine a match. In response to the authentication of the unique share code 354, the database 130 may determine which of the ID codes 182*b* of the users 180*a*-180*n* matches the scanned unique share code 354. The database 130 may communicate the comments 192*a*-192*n* from the one of the comment lists 190*a*-190*n* associated with the one of the users 180*a*-180*n* that has the matching ID codes 182*b* to the mobile device 100*a*. The comments 192*a*-192*n* may be displayed as the read only comments 362*a*-362*n*.

The read only comments 362*a*-362*n* may display the comments 192*a*-192*n* in a chronological order. In an example, if the user (e.g., the user 180*b*) that shared the comments 192*a*-192*n* has promoted any of the comments 192*a*-192*n*, the promoted comment(s) may be listed first before the chronological listing. The read only comments 362*a*-362*n* may be viewed by the operator of the mobile device 100*a*. Scanning the unique share code 354 may not provide the option for the operator of the mobile device 100*a* to add the comment 232 (e.g., the unique code 254 may be shared to enable adding the comment 232).

Generally, the read only comments 362*a*-362*n* may only be viewed by the operator of the mobile device 100*a*. In some embodiments, if the operator of the mobile device 100*a* is the person that provided a particular one of the comments 192*a*-192*n*, then the operator of the mobile device 100*a* may have an option to edit only the comment(s) that the operator of the mobile device 100*a* has provided. In an example, a guest user viewing the read only comments 362*a*-362*n* may not have the option to edit one of the comments 192*a*-192*n*. In the example, shown, the comment 192*a* may be left by the user A, which matches the user name 210 of the operator of the mobile device 100*a*. Since the user A has left the comment 192*a*, a button 364 is shown for the comment 192*a*. Since the user name 210 of the operator of the mobile device 100*a* does not match any of the other comments 192*b*-192*n* shown, the button 364 may not be provided for any of the other comments 192*a*-192*n*.

The button 364 may be an edit button. The edit button 364 may enable the operator of the mobile device 100*a* to make changes to the comment(s) 192*a*-192*n* that the particular user has previously provided. In an example, the edit button 364 may enable the operator of the mobile device 100*a* to correct a typo and/or provide clarification for a previously submitted comment. In an example, in response to the edit button 364, the app 102 may provide an input similar to the comment box 230 for providing the comment 232. Similar to the approval for a new comment, the edit provided in response to using the edit button 364 may not be updated to the comments 192*a*-192*n* until the user that receives the edited comment (e.g., the user 180*b*) approves the edit to the comment.

Figure 6:
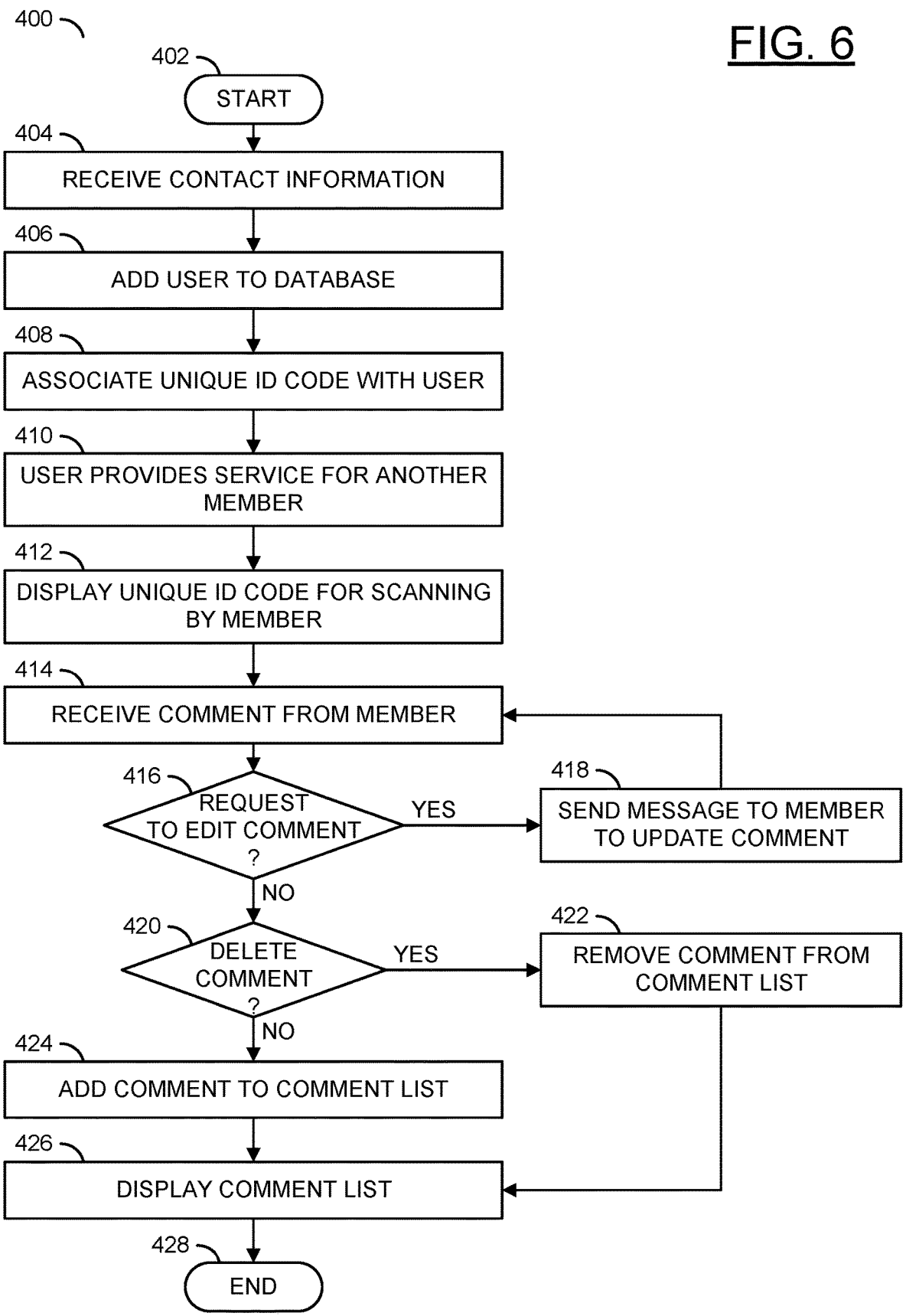
FIG. 6 is a flow diagram illustrating a method for implementing a platform independent positive recommendation system.

Referring to FIG. 6, a method (or process) 400 is shown. The method 400 may implement a platform independent positive recommendation system. The method 400 generally comprises a step (or state) 402, a step (or state) 404, a step (or state) 406, a step (or state) 408, a step (or state) 410, a step (or state) 412, a step (or state) 414, a decision step (or state) 416, a step (or state) 418, a decision step (or state) 420, a step (or state) 422, a step (or state) 424, a step (or state) 426, and a step (or state) 428.

The step 402 may start the method 400. In the step 404, the platform independent recommendation server 120 may receive contact information. To create an account a user may provide contact information. The contact information may be used to help identify a user (e.g., job or service provided). After the user has created an account, the contact information may not be needed (e.g., unless the user changes an address or job/service). In an example, the users registering with the platform independent recommendation server 120 may use one of the user devices 100*a*-100*n* (e.g., by installing the app 102 and/or accessing the websites 142*a*-142*n*) to register. Next, the method 400 may move to the step 406.

In the step 406, the processor 132*a* of the platform independent recommendation server 120 may add the new user to the database 130 as one of the users 180*a*-180*n*. In the step 408, the database 130 may associate the new one of the users 180*a*-180*n* with one set of the unique ID codes 182*b*. The contact information provided may be stored as the ID information 182*a*. The user may also set up the user preferences 182*n* which may be stored in the appropriate account for the users 180*a*-180*n*. Next, the method 400 may move to the step 410.

In the step 410, one of the users 180*a*-180*n* may provide a service for another person (e.g., another one of the users 180*a*-180*n* or anyone else). In an example, a physiotherapist may treat a patient. In another example, a coach may provide personalized training for a client. The services provided by the users 180*a*-180*n* may be independent of the platform independent recommendation server 120. For example, the comments 192*a*-192*n* may be provided for any reason. Next, in the step 412, the one of the users 180*a*-180*n* that provided the service may provide the commenter with the unique code 254. The unique code 254 may be a commenting version of the unique ID codes 182*b* associated with the user accounts 180*a*-180*n*. In the step 414, the one of the users 180*a*-180*n* that provided the service may receive the comment 232 from the commenter. Next, the method 400 may move to the decision step 416.

In the decision step 416, the app 102 may determine whether the user has sent a request to edit the comment 232. In one example, if the commenter is a guest, there may not be an option to request an edit to the comment 232. The users 180a-180n may decide whether to request the comment be edited by using the reply option 324. If the user has requested a comment edit, then the method 400 may move to the step 418. In the step 418, a message may be sent to the commenter to update the comment 232 (e.g., correct a typo, remove profanity, remove slang language, etc.). Next, the method 400 may return to the step 414 to receive the updated comment. In the decision step 416, if the user has not requested an edit, then the method 400 may move to the decision step 420.

In the decision step 420, the user may determine whether to delete the comment 232. In one example, if the comment 232 was provided by a guest user, then no reply option may be available, and the users 180a-180n may only have the delete option 322 or the accept option 326. If the user has selected the delete option 322, then the method 400 may move to the step 422. In the step 422, the database 130 may remove the comment 232 from the associated one of the comment lists 190a-190n. Next, the method 400 may move to the step 426. In the decision step 420, if the user has not deleted the comment (e.g., the user selects the accept option 326), then the method 400 may move to the step 424.

In the step 424, the database 130 may save the comment 232 in the one of the comment lists 190a-190n associated with the one of the users 180a-180n that received the comment 232. The comment 232 may be added as one of the comments 192a-192n. Next, in the step 426, the comments 192a-192n may be displayed with the comment lists 190a-190n (e.g., if the comment list has been made publicly available). Next, the method 400 may move to the step 428. The step 428 may end the method 400.

Figure 7:
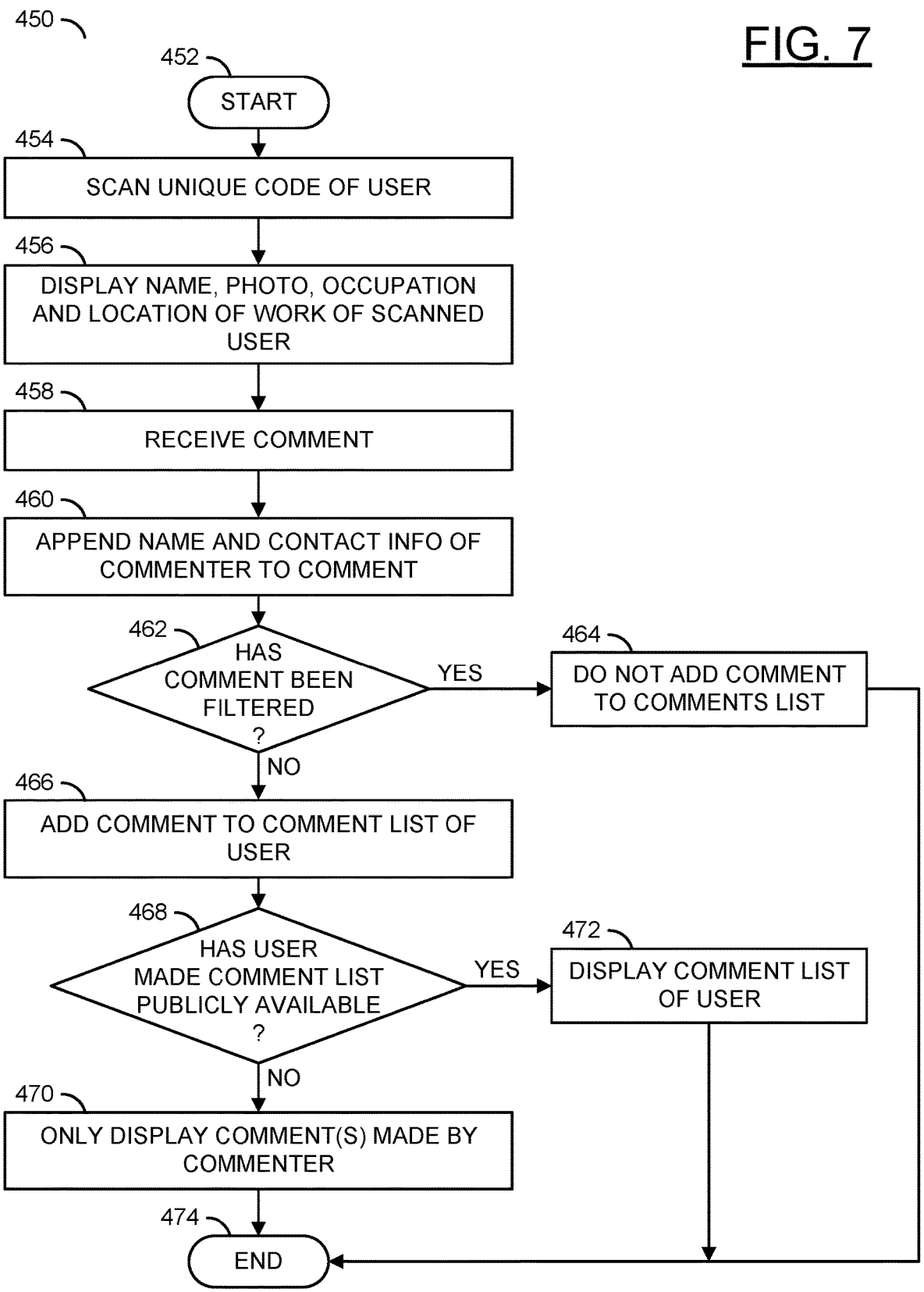
FIG. 7 is a flow diagram illustrating a method for receiving and approving a comment.

Referring to FIG. 7, a method (or process) 450 is shown. The method 450 may receive and approve a comment. The method 450 generally comprises a step (or state) 452, a step (or state) 454, a step (or state) 456, a step (or state) 458, a step (or state) 460, a decision step (or state) 462, a step (or state) 464, a step (or state) 466, a decision step (or state) 468, a step (or state) 470, a step (or state) 472, and a step (or state) 474.

The step 452 may start the method 450. In the step 454, the commenter may use the camera/scanner 104d of one of the mobile devices 100a-100n to scan the unique code 254 of one of the users 180a-180n. In the step 456, the mobile device 100a of the commenter may display the name, photo, occupation and/or location of the work of the one of the users 180a-180n that has one of the ID codes 182b that matches the unique code 254. In one example, in response to scanning the unique code 254, the authentication module 160 may allow access to the database 130 to retrieve the ID info 182a of the scanned one of the users 180a-180n. Next, in the step 458, the scanned one of the users 180a-180n may receive the comment 232 using the app 102. In the step 460, the app 102 may append the name and/or contact info of the commenter to the comment 232. The unique code 254 may be scanned using a mobile phone (e.g., a smartphone with a camera). In some embodiments, the unique code 254 may be a link that may be an element of one of the web pages 142a-142n. The unique code 254 may enable the computing devices 100a-100n to open an interface (e.g., the app 102) for providing comments to a particular one of the users 180a-180n. For example, if the commenter is one of the users 180a-180n the database 130 may retrieve the ID info 182a of the commenter to append to the comment 232. If the commenter is not one of the users 180a-180n a name and/or an email address may be appended to the comment 232. Next, the method 450 may move to the decision step 462.

In the decision step 462, the database 130 may determine whether the comment 232 has been filtered. In an example, the review filter 152 may use AI to analyze the content of the comment 232. The review filter 152 may enable deletion of negative comments automatically (e.g., in addition to the user option to manually delete comments by the users 180a-180n). If the comment 232 has been filtered by the review filter 152, the method 450 may move to the step 464. In the step 464, the database 130 may not add the comment 232 to one of the comment lists 190a-190n (e.g., the comment 232 may be deleted). Next, the method 450 may move to the step 474. If the comment 232 has not been filtered out by the review filter 152, then the method 450 may move to the step 466. In the step 466, the database 130 may add the comment 232 to the one of the comment lists 190a-190n associated with the comment recipient user. Next, the method 450 may move to the decision step 468.

In the decision step 468, the database 130 may determine whether the one of the users 180a-180n that received the comment 232 has set the associated one of the comment lists 190a-190n to be publicly available. If the comment list is not publicly available, then the method 450 may move to the step 470. In the step 470, then only the one of the comments 192a-192n that corresponds to the comment 232 may be displayed to the commenter. Next, the method 450 may move to the step 474. In the decision step 468, if the comment list is publicly available, then the method 450 may move to the step 472. In the step 472, all of the comments 192a-192n of the comment list may be displayed. Next, the method 450 may move to the step 474. The step 474 may end the method 450.

Figure 8:
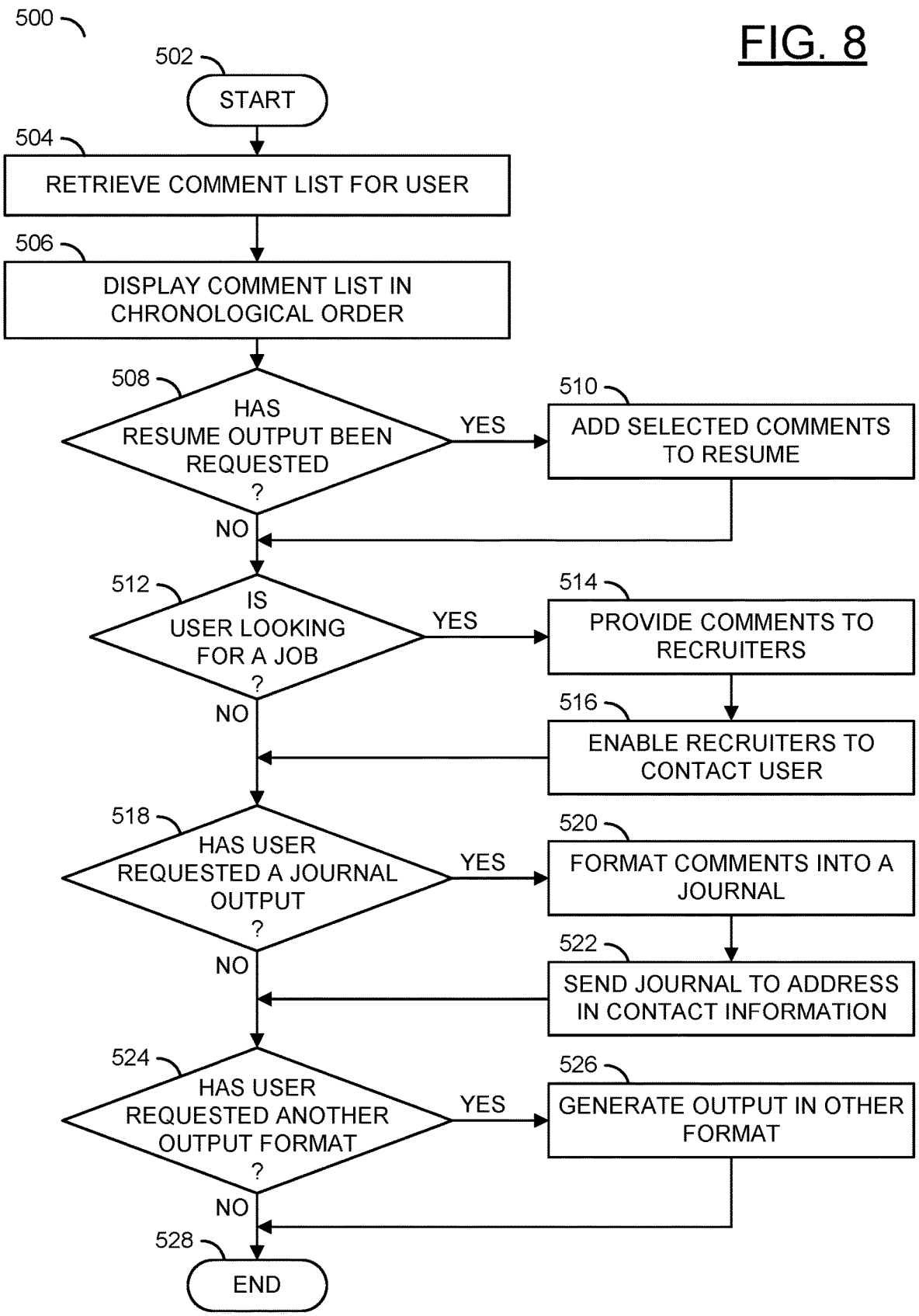
FIG. 8 is a flow diagram illustrating a method for selecting an output format for comments.

Referring to FIG. 8, a method (or process) 500 is shown. The method 500 may select an output format for comments. The method 500 generally comprises a step (or state) 502, a step (or state) 504, a step (or state) 506, a decision step (or state) 508, a step (or state) 510, a decision step (or state) 512, a step (or state) 514, a step (or state) 516, a decision step (or state) 518, a step (or state) 520, a step (or state) 522, a decision step (or state) 524, a step (or state) 526, and a step (or state) 528.

The step 502 may start the method 500. In the step 504, the database 130 may retrieve the respective one of the comment lists 190a-190n for the particular one of the users 180a-180n. Next, in the step 506, the app 102 (or one of the websites 142a-142n) may display the selected one of the comment lists 190a-190n in chronological order (e.g., the chronological comments 314a-314n). Next, the method 500 may move to the decision step 508.

In the decision step 508, the app 102 may determine whether a resume output has been requested. In an example, the CV format option 304a may be selected. If the resume output has been requested, then the method 500 may move to the step 510. In the step 510, the database 130 may add the comments 192a-192n to the resume output format as defined by the output formats 150. In some embodiments, only selected comments (e.g., promoted using the promote option 330) may be added to the resume output format. Next, the method 500 may move to the decision step 512. In the decision step 508, if the resume output has not been requested, then the method 500 may move to the decision step 512.

In the decision step 512, the app 102 may determine whether the user is looking for a job. For example, the user preferences 182n may have a setting and/or an option to enable a job search. If the user is looking for a job, then the method 500 may move to the step 514. In the step 514, the comments 192a-192n for the user may be presented to job recruiters. Next, in the step 516, the recruiters may be able to use the platform independent recommendation server 120 to contact particular users 180a-180n about job opportunities. Next, the method 500 may move to the decision step 518. In the decision step 512, if the user is not looking for a job, then the method 500 may move to the decision step 518.

In the decision step 518, the app 102 may determine whether the user has requested a journal output. In an example, the journal format 304b may be used to request a journal output for the comments 192a-192n. In some embodiments, other of the users 180a-180n may request the journal format 304b for another one of the users 180a-180n (e.g., to provide a gift). Generally, the journal format 304b may be ordered by the account holder (e.g., purchase for themselves) and/or an employer (e.g., an employer may make the purchase for an employee). If the journal output has been requested, then the method 500 may move to the step 520. In the step 520, the database 130 may format the comments 192a-192n for the particular one of the users 180a-180n into the journal according to the output formats 150. Next, in the step 522, the hard copy of the journal with the comments 192a-192n may be sent to the address of the selected one of the users 180a-180n. In an example, the address of the users 180a-180n may be available in the ID info 182a. Next, the method 500 may move to the decision step 524. In the decision step 518, if the user has not requested the journal output, then the method 500 may move to the decision step 524.

In the decision step 524, the app 102 may determine whether the user has requested another format. In an example, the output format options 304a-304n may be used to select various available output formats (e.g., a poster, business cards, HTML/PHP code for a website, etc.). If the user has selected another one of the output formats, then the method 500 may move to the step 526. In the step 526, the database 130 may output the comments 192a-192n in the selected format type based on the data in the output formats 150. The users 180a-180n may select any type of output format and/or multiple output formats. Next, the method 500 may move to the step 528. In the decision step 524, if the user has not requested another output format, then the method 500 may move to the step 528. The step 528 may end the method 500.

Figure 9:
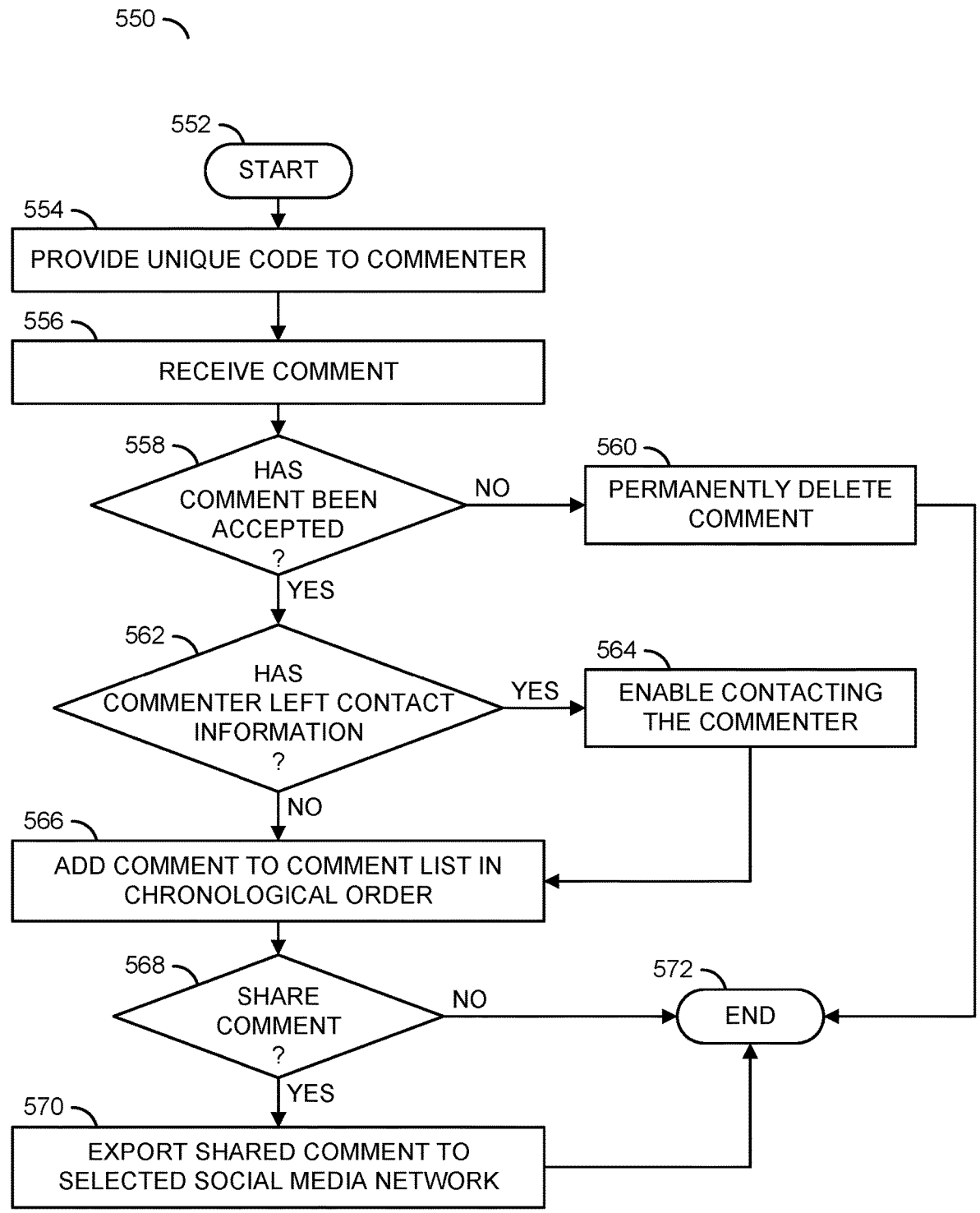
FIG. 9 is a flow diagram illustrating a method for accepting comments and enabling comments to be shared on social media.

Referring to FIG. 9, a method (or process) 550 is shown. The method 550 may accept comments and enable comments to be shared on social media. The method 550 generally comprises a step (or state) 552, a step (or state) 554, a step (or state) 556, a decision step (or state) 558, a step (or state) 560, a decision step (or state) 562, a step (or state) 564, a step (or state) 566, a decision step (or state) 568, a step (or state) 570, and a step (or state) 572.

The step 552 may start the method 550. In the step 554, one of the users 180a-180n (e.g., a user that provided a service) may provide the unique code 254 (e.g., a QR code) to the commenter (e.g., another one of the users 180a-180n and/or a guest). Next, in the step 556, the app 102 used by the commenter may receive the comment 232. The comment 232 may be communicated to the database 130. The user that received the comment 232 may view the new comment 232 as one of the comments 192a-192n. Next, the method 550 may move to the decision step 558.

In the decision step 558, the database 130 may determine whether the comment has been accepted. In an example, the users 180a-180n may use the delete option 322 or the accept option 326 available on the app 102 and/or the websites 142a-142n to decide whether to keep or remove the new comment 232. If the user has not accepted the new comment 232, then the method 550 may move to the step 560. In the step 560, the database 130 may permanently delete the new comment 232 from the comments 192a-192n in response to the delete option 322. Next, the method 550 may move to the step 572. In the decision step 558, if the comment has been accepted (e.g., the accept option 326 has been selected), then the method 550 may move to the decision step 562.

In the decision step 562, the app 102 may determine whether the commenter has left contact information with the comment 232. In one example, if the commenter is one of the users 180a-180n, then the contact information may be available as the ID info 182a in the database 130. In another example, if the commenter is a guest user, then the commenter may have an option to leave an email address and/or a phone number as contact information. If the commenter has left the contact information, then the method 550 may move to the step 564. In the step 564, the app 102 may enable contacting the commenter. In an example, the reply option 324 may be enabled to allow the users 180a-180n to respond to the comment 232 (e.g., suggest changes to the comment 232, to thank the commenter, etc.). Next, the method 550 may move to the step 566. In the decision step 562, if the commenter has not left contact information, then the method 550 may move to the step 566. For example, if no contact information has been provided, the user may be able to delete the comment 232 if the comment 232 is undesirable, but may not have the reply option 324 to attempt to have the commenter provide additional edits to the comment 232. In the step 566, the comment 232 may be added to the one of the comment lists 190a-190n of the user that received the comment. The comment 232 may be added to the comments 192a-192n in chronological order. Next, the method 550 may move to the decision step 568.

In the decision step 568, the app 102 may determine whether the user has selected to share the comment. For example, the share option 328 may enable the user to share the new comment 232 and/or any of the other comments 192a-192n to one or more of the social media servers 110a-110n. If the user has not shared the comment, then the method 550 may move to the step 572. If the user has shared the comment, then the method 550 may move to the step 570. In the step 570, the database 130 may export the shared comment to the selected one or more of the social media servers 110a-110n. For example, the comments 192a-192n may be formatted using the output formats 150 according to an API provided by the social media servers 110a-110n to enable the comments 192a-192n to be shared on various social media platforms. Next, the method 550 may move to the step 572. The step 572 may end the method 550.

Figure 10:
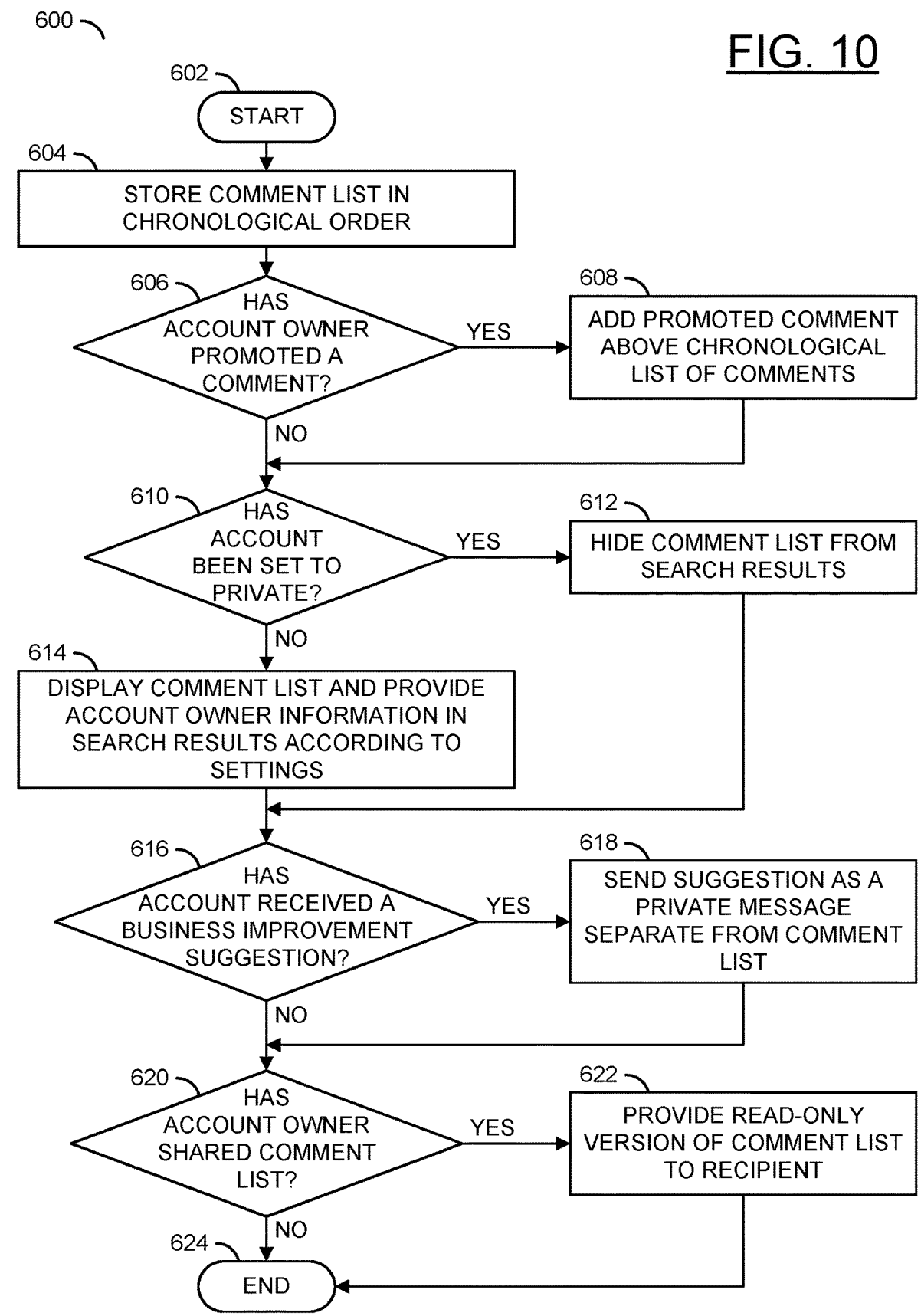
FIG. 10 is a flow diagram illustrating a method for promoting comments.

Referring to FIG. 10, a method (or process) 600 is shown. The method 600 may promote comments. The method 600 generally comprises a step (or state) 602, a step (or state) 604, a decision step (or state) 606, a step (or state) 608, a decision step (or state) 610, a step (or state) 612, a step (or state) 614, a decision step (or state) 616, a step (or state) 618, a decision step (or state) 620, a step (or state) 622, and a step (or state) 624.

The step 602 may start the method 600. In the step 604, the database 130 may store the comments 192a-192n of each of the comment lists 190a-190n in chronological order. The comments 192a-192n may be displayed on the app 102 as the chronological comments 314a-314n by default. Next, the method 600 may move to the decision step 606.

In the decision step 606, the app 102 may determine whether the account owner has promoted one or more of the comments 192a-192n. For example, the users 180a-180n may select the promotion option 330 to promote one or more of the comments 192a-192n. If the account owner has promoted a comment, then the method 600 may move to the step 608. In the step 608, the promoted comment may be reordered to be above the chronological list of the comments 192a-192n. Next, the method 600 may move to the decision step 610. In the decision step 606, if the account owner has not promoted one of the comments 192a-192n, then the method 600 may move to the decision step 610.

In the decision step 610, the database 130 may determine whether the account has been set to private. For example, the user preferences 182n may have an option to keep the profile public or private. In some embodiments, the account type may be based on the type of occupation (e.g., for security and/or confidentiality reasons). In some embodiments, businesses may be able to open accounts and may keep the profile and comments publicly available and have rights to delete negative comments (e.g., prevent review bombing). If the account has been set to private, then the method 600 may move to the step 612. In the step 612, the comment list 190a-190n for the user may hidden from search results. Generally, the display of the comments 192a-192n may depend on whether the users 180a-180n have selected a public or private account. In some embodiments, one account may have an option to keep the profile (e.g., contact information) and the comments 192a-192n open to the public (e.g., searches of the database 130) and another account type may have the profile open to the public but have options to keep particular information private (e.g., the comments 192a-192n may be public, but the user may individually select to keep private one or more of an address, a phone number, reviews, and occupation, location of employment, employment status, etc.). The users 180a-180n may be further able to select particular comments 192a-192n to keep public and others to keep private. Next, the method 600 may move to the decision step 616. In the decision step 610, if the account is set to public, then the method 600 may move to the step 614. In the step 614, with the public account type, the database 130 may make the comments 192a-192n and the account owner information (e.g., some or all of the ID info 182a and/or the comments 192a-192n according to the selected preferences 182n) available in search results. Next, the method 600 may move to the decision step 616.

In the decision step 616, the database 130 may determine whether the account has received a business improvement suggestion. A business improvement suggestion may be presented as one of the new comments 232 and/or may be flagged as a particular type of comment. In an example, the review filter 152 may be configured to analyze the new comment 232 and/or determine whether the new comment 232 is a business improvement suggestion. If the account has received a business improvement suggestion, then the method 600 may move to the step 618. In the step 618, the database 130 may send the suggestion to the user via the app 102 as a private message and prevent the suggestion from being added to the comment lists 190a-190n. For example, business improvement suggestions may be sent to the user to read and react to the business improvement section without making the suggestion viewable to others (e.g., to prevent shaming and/or to keep the comments 192a-192n positive and/or encouraging). For example, the suggestions for improvement may be separate from the comments 192a-192n (e.g., the business improvement suggestion may be stored temporarily in the memory 132b, while the comments 192a-192n are stored in the database 130). A commenter may have separate options, one to select to send one of the comments 192a-192n and another to select to send a suggestion to the business. Next, the method 600 may move to the decision step 620. In the decision step 616, if the account has not received a business improvement suggestion, then the method 600 may move to the decision step 620.

In the decision step 620, the database 130 may determine whether the account owner has shared the respective one of the comment lists 190a-190n. In some embodiments, a comment viewer may scan the unique share code 354, which may enable the account owner to share the comments 192a-192n. If the account holder has shared the comment list, then the method 600 may move to the step 622. In the step 622, the database 130 may provide a read-only version of the comments 192a-192n to the recipient (e.g., the read only comments 362a-362n). The comment viewer may read, but may not be able to edit the comments 192a-192n. Next, the method 600 may move to the step 624. In the decision step 620, if the account owner has not shared the comment list, then the method 600 may move to the step 624. The step 624 may end the method 600.

An account may have an option to only receive positive comments. An account may have an option to receive positive comments with improvement suggestions. The improvement suggestions may enable gathering ideas from customers regarding how the users 180a-180n may improve themselves and/or their business. For example, each user may want to know how to get better. Improvement suggestions may be private (e.g., unable to be viewed by the public), while the positive feedback may be public. Positive comments may be seen publicly and other comments may only by seen by a business person. An employer or user may reply to the improvement suggestions. Generally, the only comments that may be seen publicly in a public account may be the comments 192a-192n that have been accepted (e.g., approved). If one of the comments 192a-192n is pending (e.g., for accepted, share, or decline status), then the particular comment may not be available to view by others online.

Figure 11:
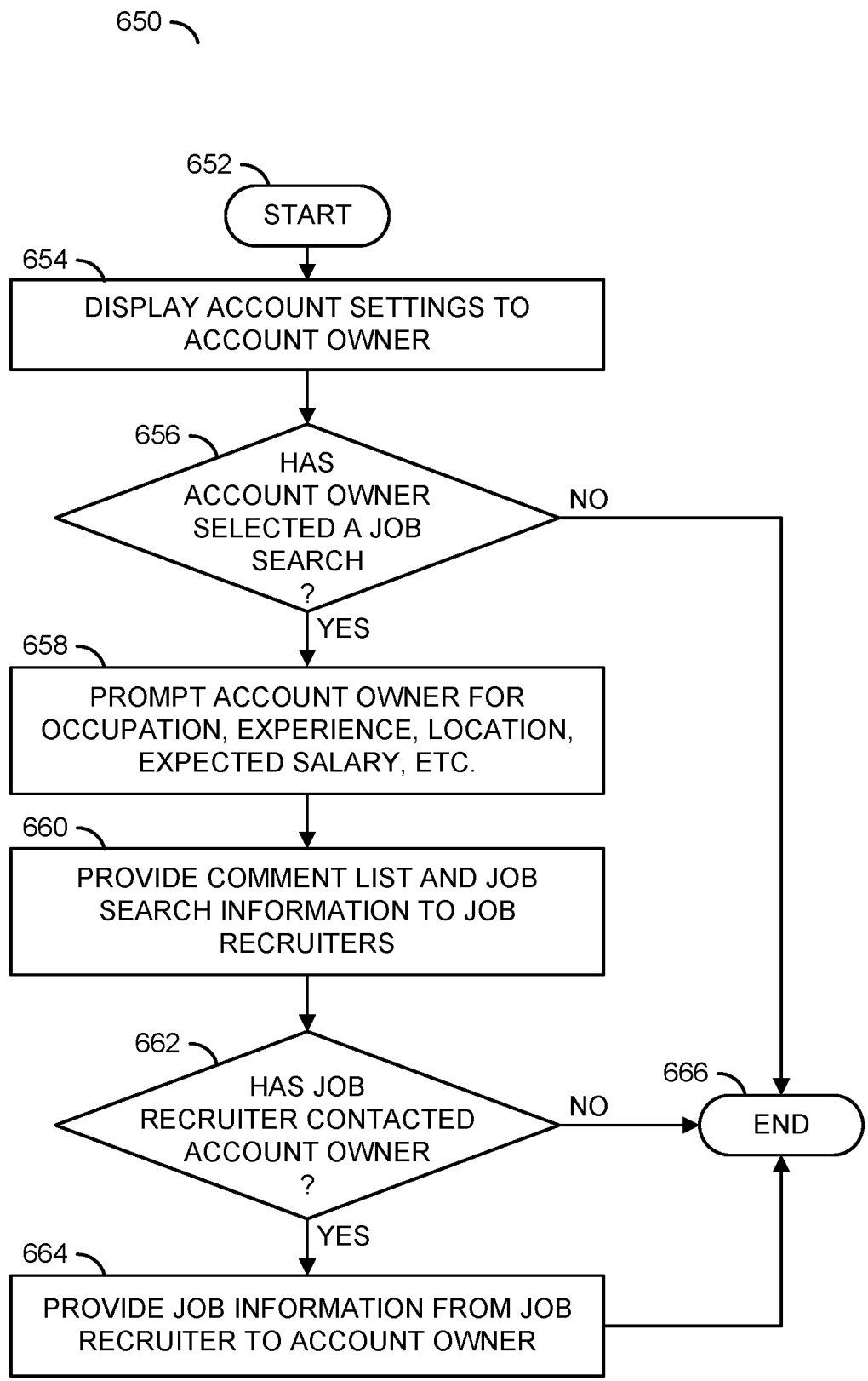
FIG. 11 is a flow diagram illustrating a method for providing a job search.

Referring to FIG. 11, a method (or process) 650 is shown. The method 650 may provide a job search. The method 650 generally comprises a step (or state) 652, a step (or state) 654, a decision step (or state) 656, a step (or state) 658, a step (or state) 660, a decision step (or state) 662, a step (or state) 664, and a step (or state) 666.

The step 652 may start the method 650. In the step 654, the app 102 may display the account settings to the account owner (e.g., one of the users 180a-180n). The account settings may provide options for selecting the user preferences 182n. Next, the method 650 may move to the decision step 656.

In the decision step 656, the app 102 may determine whether the account owner has selected a job search. For example, one of the options available in the account settings may enable the user preferences 182n to be edited to allow a job search. If the account owner has not selected a job search, then the method 650 may move to the step 666. If the account owner has selected a job search, then the method 650 may move to the step 658. In the step 658, the app 102 may prompt the account owner to input job search information. For example, the app 102 may provide input fields for job search information such as, occupation, experience level, desired region/location for a job, expected salary, etc. The job search information may be stored in the database 130 as the ID info 182a. Next, in the step 660, the database 130 may provide the comment list 190a-190n and the ID info 182*a* corresponding to the job search information for the user that is searching for a job to job recruiters. The job recruiters may be some of the users 180*a*-180*n*. Next, the method 650 may move to the decision step 662.

In the decision step 662, the database 130 may determine whether one of the job recruiters has requested to contact one of the users 180*a*-180*n* that has provided the job search information. If no job recruiter has made contact, then the method 650 may move to the step 666. If the job recruiter has requested contact, then the method 650 may move to the step 664. In the step 664, the database 130 may provide the job information from the job recruiter to the account owner. The app 102 may display the job information (or job offer). Next, the method 650 may move to the step 666. The step 666 may end the method 650.

Each account may have questions about if the user is actively looking for job. If one of the users 180*a*-180*n* is actively looking for a job, the app 102 may automatically allow recruiters to view the profile and/or the comments 192*a*-192*n*. The recruiters may have an account in the database 130 for helping the users 180*a*-180*n* to find better opportunities based on positive reviews and helping recruiters to find the best candidates. The recruiters and candidates may only be able to contact each other by using the system 50 (e.g., creating an account). If the user is looking for a job, the app 102 may automatically ask questions about location, position, salary expectation, etc.

Referring to FIG. 12, a method (or process) 700 is shown. The method 700 may accumulate points based on comments. The method 700 generally comprises a step (or state) 702, a step (or state) 704, a decision step (or state) 706, a step (or state) 708, a decision step (or state) 710, a step (or state) 712, a decision step (or state) 714, a step (or state) 716, a step (or state) 718, a decision step (or state) 720, a step (or state) 722, and a step (or state) 724.

The step 702 may start the method 700. In the step 704, the database 130 may receive the comment 232 based on a match between the unique code 254 and the commenting entry of the unique ID codes 182*b* in the user accounts 180*a*-180*n*. Next, the method 700 may move to the decision step 706. In the decision step 706, the database 130 may determine whether the user that received the comment has a business account. The business account information may be part of the ID info 182*a*. For example, a business account may indicate that the user is an employee for a larger business that may have multiple employees with the user accounts 180*a*-180*n*. If the user does not have a business account, then the method 700 may move to the step 724. If the user does have a business account, then the method 700 may move to the step 708. In the step 708, the review filter 152 may analyze the comment. Next, the method 700 may move to the decision step 710.

In the decision step 710, the review filter 152 may determine whether the comment 232 received is associated with job performance for a particular. For example, some comments may be personal and some comments may be used as a job performance review. In another example, some of the users 180*a*-180*n* may have multiple jobs and the comments received may be for one job and not another. If the comment 232 is not associated with job performance for a particular job for the business account, then the method 700 may move to the step 724. If the comment 232 is associated with job performance for a particular job for the business account, then the method 700 may move to the step 712. In the step 712, the database 130 may add points to the business account of the account holder. The points may be stored as part of the user data 182*a*-182*n* for the particular user accounts 180*a*-180*n*. Next, the method 700 may move to the decision step 714.

In the decision step 714, the database 130 may determine whether the manager has approved the comment 232. In an example, for a business account, the user accounts 180*a*-180*n* that are listed as manager accounts may have access to the comment lists 190*a*-190*n* of the users 180*a*-180*n* that are listed as employee accounts for the particular manager (e.g., only the comments 192*a*-192*n* that are associated with the job with the particular business account). The manager may view and/or approve comments received. If the manager has approved the comment, then the method 700 may move to the step 716. In the step 716, the database 130 may add additional points to the business account of the account holder. For example, each comment received by a business account holder may be worth 10 points and each approved comment may receive an additional 10 points. Next, the method 700 may move to the step 718. In the decision step 714, if the manager has not approved the comment, then the method 700 may move to the step 718. In the step 718, the app 102 may enable access to the webshop. For example, one or more of the websites 142*a*-142*n* may provide a webshop that may enable the users 180*a*-180*n* to use the points accumulated (or a combination of points and money) to purchase items from the webshop. Next, the method 700 may move to the decision step 720.

In the decision step 720, the websites 142*a*-142*n* and/or the app 102 providing the webshop may determine whether the account holder has selected an item. In an example, the item may comprise buying the comments 192*a*-192*n* in one of the output formats 150 (e.g., buying a hardcover book of the comments 192*a*-192*n*). If the account holder has not selected an item, then the method 700 may move to the step 724. If the account holder has selected an item, then the method 700 may move to the step 722. In the step 722, the database 130 may enable payment for the selected item using points in the business account. Next, the method 700 may move to the step 724. The step 724 may end the method 700.

An employer may enroll all employees into the system 50 and the comments 192*a*-192*n* may automatically become available to be seen by a supervisor or other higher management person. The user may add comments as a reply underneath and/or verify the comments 192*a*-192*n* depending upon the field of employment.

The comments 192*a*-192*n* may be published to the social media servers 110*a*-110*n*. The comments 192*a*-192*n* may be output to various formats. One of the output formats may be a journal. The journal may be a published and/or printed book (e.g., a physical book or electronic book). For example, if at the end of closing an account, upon retirement and/or upon client request the database 130 may be configured to generate a journal or comment book or another type of output format that may be mailed to the user. For example, the book may be a retirement gift that may be bought by a client or coworkers.

Any individual account holder may have a chance to be informed if any new position or job becomes available from a current employer. The app 102 may provide a one click button to press apply to the available position. Similarly, if another employer has a position available (e.g., recruiting employees) then the users 180*a*-180*n* that are job recruiters may press a button on the app 102 to inform of an available position and the system 50 may forward the position to people who are looking for a job or help the users 180*a*-180*n* to find job (e.g., the system 50 may act as a recruiter).

If a person finds a new job, the comments 192a-192n may follow the user from job to job (e.g., provide a career overview). For example, instead of reviewing a company, the commenter may review the individual that is actually being interacted with. The users 180a-180n may be reviewed separately for different services provided. For example, the database 130 may store a first account and a second account for one or more of the users 180a-180n. The first account may apply to one type of service provided by the user (e.g., a full-time job, a career, etc.) and the second account may apply to another type of service provided by the user (e.g., a side-job, a hobby, etc.).

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. A system comprising:
  a database configured to (a) store, sort and retrieve for each of a plurality of users (i) a unique account and (ii) comments associated with said unique account and (b) provide a commenter access to write said comments to said unique account in response to an identification code specific to said unique account;
  a first computing device configured to (i) display comments retrieved from said database associated with said unique account, and (ii) generate said identification code to provide access to said database for said commenter to add said comments to said unique account; and
  a second computing device configured to (i) scan said identification code, (ii) generate an interface for adding said comments in response to scanning said identification code, and (iii) communicate said comments for said unique account by said commenter to said database, wherein
    (i) said comments comprise positive feedback about said users,
    (ii) said identification code enables said commenter to add said comments without being one of said users,
    (iii) said comments are displayed in response to an approval by said user of said unique account, (iv) said positive feedback comprises a personalized message by said commenter about a performance of one of said users,
(v) said identification code is generated to enable said second computing device to scan said identification code,
(vi) said first computing device and said second computing device are each a mobile device, and
(vii) said identification code comprises at least one of a barcode and a QR code.

2. The system according to claim 1, wherein said comments are displayed according to an output option selected by said users.

3. The system according to claim 2, wherein said output option comprises a journal, said comments are formatted to said journal and said journal is mailed to an address associated with one of said users.

4. The system according to claim 2, wherein said output option comprises a resume and said comments are inserted into said resume generated for one of said users.

5. The system according to claim 1, wherein said database is configured to provide storage for a platform independent recommendation system.

6. The system according to claim 1, wherein said comments comprise an authentication from said commenter.

7. The system according to claim 6, wherein (i) said commenter is one of said users and (ii) said unique account provides said authentication for said comments provided by said users.

8. The system according to claim 6, wherein (i) said commenter is not one of said users and (ii) contact information of said commenter provides said authentication.

9. The system according to claim 6, wherein said authentication is (i) displayed with said comments in a private mode viewable only by one of said users that received said comments and (ii) not displayed with said comments in a public mode viewable by anybody.

10. The system according to claim 1, wherein (i) said identification code is an element of a webpage viewable using said second computing device and (ii) said second computing device is configured to generate an interface for adding said comments in response to engaging with said identification code.

11. The system according to claim 1, wherein (i) said unique account corresponds to a service provided by one of said users and (ii) said performance of one of said users comprises providing said service and said comments comprise a positive review for said service from said commenter.

12. The system according to claim 11, wherein (i) said database is configured to store a second account for each of one or more of said users and (ii) said second account corresponds to a second service provided by said one or more of said users.

13. The system according to claim 1, wherein (i) said first computing device is configured to receive contact information from one of said users as a first time setup for said unique account and (ii) said database is configured to store said contact information comprising one or more of a name, a professional license number, a company name, a resume, an occupation and years of experience.

14. The system according to claim 1, wherein said approval for display of one of said comments is denied in response to said users deleting said one of said comments.

15. The system according to claim 1, wherein said approval for display of one of said comments comprises (i) one of said users asking said commenter that provided said one of said comments to edit said one of said comments and (ii) displaying said one of said comments after receiving said edit of said one of said comments.

16. The system according to claim 1, wherein said approval for display of said comments comprises (i) implementing an artificial intelligence model to screen said comments to ensure said comments comprise said positive feedback about said users, (ii) enabling a display of said comments if said comments comprise said positive feedback and (iii) deleting said comments if said comments do not comprise said positive feedback.

17. The system according to claim 1, wherein (i) said first computing device is configured to execute computer readable instructions for a mobile app and (ii) said mobile app is configured to enable access to said database.

18. A system comprising:
a database configured to store, sort and retrieve for each of a plurality of users (i) a unique account and (ii) comments associated with said unique account;
a first computing device configured to (i) display comments retrieved from said database associated with said unique account, and (ii) generate an identification code to enable a commenter to add said comments to said unique account;
a second computing device configured to (i) scan said identification code, (ii) generate an interface for adding said comments in response to scanning said identification code, and (iii) communicate said comments for said unique account by said commenter to said database; and
a third computing device configured to (i) receive an order associated with said unique account for a journal, (ii) format said comments of said unique account into a journal, and (iii) print a hard copy of said journal, wherein
(i) said comments comprise positive feedback about said users,
(ii) said identification code enables said commenter to add said comments without being one of said users,
(iii) said comments are displayed in response to an approval by said user of said unique account,
(iv) said positive feedback comprises a personalized message by said commenter about a performance of one of said users,
(v) said identification code is generated to enable said second computing device to scan said identification code,
(vi) said first computing device and said second computing device are each a mobile device, and
(vii) said identification code comprises at least one of a barcode and a QR code.

* * * * *